US006265061B1

(12) United States Patent
Kang et al.

(10) Patent No.: US 6,265,061 B1
(45) Date of Patent: Jul. 24, 2001

(54) RETROFLECTIVE ARTICLES INCLUDING A CURED CERAMER COMPOSITE COATING HAVING ABRASION AND STAIN RESISTANT CHARACTERISTICS

(75) Inventors: Soonkun Kang, Lake Elmo; John L. Ethen, Oakdale; Gregory E. Gilligan, Hastings, all of MN (US); Christopher J. Gustafson, Hudson, WI (US); Sithya Seda Khieu, Eden Prairie, MN (US); Kanta Kumar, Maplewood, MN (US); Thomas W. Rambosek; Tzu Li Joseph Huang, both of Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/389,554

(22) Filed: Sep. 3, 1999

Related U.S. Application Data

(63) Continuation-in-part of application No. 09/209,300, filed on Dec. 10, 1998, now abandoned, which is a continuation-in-part of application No. 09/071,970, filed on May 4, 1998.

(51) Int. Cl.$^7$ ........................................................ B32B 5/16
(52) U.S. Cl. .......................... 428/323; 428/325; 428/327; 428/331; 428/447; 428/908.8
(58) Field of Search .................................. 428/323, 331, 428/325, 327, 447, 908.8

(56) References Cited

U.S. PATENT DOCUMENTS

| | | |
|---|---|---|
| 2,801,185 | 7/1957 | Iler . |
| 3,712,706 | 1/1973 | Stamm . |
| 3,787,467 | 1/1974 | Lucking et al. . |
| 3,924,929 | 12/1975 | Holmen . |
| 3,940,359 | 2/1976 | Chambers . |
| 4,025,159 | 5/1977 | McGrath . |
| 4,177,315 | 12/1979 | Ubersax . |
| 4,188,451 | 2/1980 | Humphery . |
| 4,202,600 | 5/1980 | Burke et al. . |
| 4,243,618 | 1/1981 | Van Arnam . |
| 4,260,220 | 4/1981 | Whitehead . |
| 4,265,938 | 5/1981 | Jack et al. . |
| 4,311,763 | 1/1982 | Conroy . |
| 4,340,319 | 7/1982 | Johnson, Jr. et al. . |
| 4,349,598 | 9/1982 | White . |
| 4,409,285 | 10/1983 | Swerdlow . |
| 4,440,590 | 4/1984 | Collins et al. . |
| 4,455,205 | 6/1984 | Olson et al. . |
| 4,476,281 | 10/1984 | Vaughn, Jr. . |
| 4,478,876 | 10/1984 | Chung . |
| 4,478,909 | 10/1984 | Taniguchi et al. . |
| 4,481,254 | 11/1984 | Fukushima et al. . |
| 4,486,504 | 12/1984 | Chung . |
| 4,490,230 | 12/1984 | Fletcher . |
| 4,491,508 | 1/1985 | Olson et al. . |
| 4,518,649 | 5/1985 | Wang et al. . |
| 4,522,958 | 6/1985 | Das et al. . |
| 4,536,420 | 8/1985 | Rickert, Jr. . |
| 4,571,365 | 2/1986 | Ashlock et al. . |
| 4,576,850 | 3/1986 | Martens . |
| 4,576,864 | 3/1986 | Krautter et al. . |
| 4,588,258 | 5/1986 | Hoopman . |
| 4,594,379 | 6/1986 | Funaki et al. . |
| 4,596,662 | 6/1986 | Walker et al. . |
| 4,596,745 | 6/1986 | Chao . |
| 4,642,266 | 2/1987 | Funaki et al. . |
| 4,664,960 | 5/1987 | Ovshinsky . |
| 4,664,966 | 5/1987 | Bailey et al. . |
| 4,682,852 | 7/1987 | Weber . |
| 4,719,146 | 1/1988 | Hohage et al. . |
| 4,726,706 | 2/1988 | Attar . |
| 4,735,632 | 4/1988 | Oxman et al. . |
| 4,753,548 | 6/1988 | Forrer . |
| 4,755,425 | 7/1988 | Huang . |
| 4,764,564 | 8/1988 | Schmidt et al. . |
| 4,772,488 | 9/1988 | Pinch et al. . |
| 4,775,219 | 10/1988 | Appledorn et al. . |
| 4,797,024 | 1/1989 | Forrer . |
| 4,814,207 | 3/1989 | Siol et al. . |
| 4,818,596 | 4/1989 | Cook et al. . |
| 4,837,069 | 6/1989 | Bescup et al. . |
| 4,844,946 | 7/1989 | Komatsu et al. . |
| 4,844,976 | 7/1989 | Huang . |
| 4,875,798 | 10/1989 | May . |
| 4,885,332 | 12/1989 | Bilkadi . |
| 4,895,428 | 1/1990 | Nelson et al. . |
| 4,906,523 | 3/1990 | Bilkadi et al. . |
| 4,907,070 | 3/1990 | Cobb, Jr. . |
| 4,908,230 | 3/1990 | Miller . |
| 4,929,666 | 5/1990 | Schmidt et al. . |
| 5,006,624 | 4/1991 | Schmidt et al. . |
| 5,042,924 | 8/1991 | Terasaki et al. . |
| 5,053,177 | 10/1991 | Vetter et al. . |

(List continued on next page.)

FOREIGN PATENT DOCUMENTS

| | | |
|---|---|---|
| 052 427 A1 | 5/1982 | (EP) . |
| 052 427 B1 | 5/1982 | (EP) . |
| 153 289 A2 | 8/1985 | (EP) . |

(List continued on next page.)

OTHER PUBLICATIONS

American Society for Testing and Materials, Designation: D 523–89, "Standard Test Method for Specular Gloss," pp. 33–37 (1989).

(List continued on next page.)

*Primary Examiner*—Willian Krynski
*Assistant Examiner*—B. Shewareged
(74) *Attorney, Agent, or Firm*—Doreen S. L. Gwin

(57) ABSTRACT

A retroreflective article comprising a substrate and a cured ceramer coating provided on at least a portion of a surface of the substrate. The coated portion of the surface is retroreflective and can be dew-resistant. The ceramer is derived from a free-radically-curable binder, colloidal inorganic oxide and fluoro/silane component comprising a hydrolyzable silane moiety and a fluorinated moiety.

18 Claims, No Drawings

U.S. PATENT DOCUMENTS

| | | |
|---|---|---|
| 5,073,404 | 12/1991 | Huang . |
| 5,104,929 | 4/1992 | Bilkadi . |
| 5,117,304 | 5/1992 | Huang et al. . |
| 5,126,394 | 6/1992 | Revis et al. . |
| 5,134,021 | 7/1992 | Hosono et al. . |
| 5,176,943 | 1/1993 | Woo . |
| 5,177,304 | 1/1993 | Nagel . |
| 5,210,248 | 5/1993 | Babirad et al. . |
| 5,244,935 | 9/1993 | Oshibe et al. . |
| 5,258,225 | 11/1993 | Katsamberis . |
| 5,270,080 | 12/1993 | Mino et al. . |
| 5,274,159 | 12/1993 | Pellerite et al. . |
| 5,294,662 | 3/1994 | Moore et al. . |
| 5,307,438 | 4/1994 | Bilkadi et al. . |
| 5,314,980 | 5/1994 | Morrison . |
| 5,316,825 | 5/1994 | Nakai et al. . |
| 5,324,566 | 6/1994 | Ogawa et al. . |
| 5,368,941 | 11/1994 | Blizzard et al. . |
| 5,374,483 | 12/1994 | Wright . |
| 5,382,639 | 1/1995 | Moore et al. . |
| 5,391,210 | 2/1995 | Bilkadi et al. . |
| 5,393,590 | 2/1995 | Caspari . |
| 5,418,304 | 5/1995 | Mueller et al. . |
| 5,541,049 | 7/1996 | Ballerini et al. . |
| 5,608,003 | 3/1997 | Zhu . |
| 5,667,335 | 9/1997 | Khieu et al. . |
| 5,677,050 * | 10/1997 | Bilkadi et al. ................ 428/331 |
| 5,706,133 | 1/1998 | Orensteen et al. . |
| 5,708,048 | 1/1998 | Medford et al. . |
| 5,760,126 | 6/1998 | Engle et al. . |
| 5,859,086 | 1/1999 | Freund et al. . |
| 5,880,212 | 3/1999 | Nakagawa et al. . |
| 5,939,182 | 8/1999 | Huang et al. . |

FOREIGN PATENT DOCUMENTS

| | | |
|---|---|---|
| 286 225 B1 | 10/1988 | (EP) . |
| 337 695 A2 | 10/1989 | (EP) . |
| 410 798 B1 | 1/1991 | (EP) . |
| 424 007 B1 | 4/1991 | (EP) . |
| 491 251 A1 | 6/1992 | (EP) . |
| 492 545 A2 | 7/1992 | (EP) . |
| 537 669 A1 | 4/1993 | (EP) . |
| 576 247 B1 | 12/1993 | (EP) . |
| 620 255 A1 | 10/1994 | (EP) . |
| 628 610 A1 | 12/1994 | (EP) . |
| 675 087 | 10/1995 | (EP) . |
| 816 452 A2 | 1/1998 | (EP) . |
| 2 249 041 | 4/1992 | (GB) . |
| 59-176329 | 10/1984 | (JP) . |
| 2-260145 | 10/1990 | (JP) . |
| 3-41402 | 2/1991 | (JP) . |
| 3-50288 | 3/1991 | (JP) . |
| 7-11030 | 1/1995 | (JP) . |
| 98 03 0040 | 11/1997 | (JP) . |
| 10028700 | 2/1998 | (JP) . |
| WO 92/17337 | 10/1992 | (WO) . |
| WO 95/16522 | 6/1995 | (WO) . |
| WO 95/30539 | 11/1995 | (WO) . |
| WO 95/32237 | 11/1995 | (WO) . |
| WO 96/21700 | 7/1996 | (WO) . |
| WO 96/36669 | 11/1996 | (WO) . |
| WO 97/00917 | 1/1997 | (WO) . |
| WO 97/00995 | 1/1997 | (WO) . |
| WO 97/01599 | 1/1997 | (WO) . |
| WO 97/45502 | 12/1997 | (WO) . |
| WO 99/02611 | 1/1999 | (WO) . |

OTHER PUBLICATIONS

American Society for Testing and Materials, Designation: D–968–93, "Standard Test Methods for Abrasion Resistance of Organic Coatings by Falling Abrasive," pp. 87–90 (1993).

American Society for Testing and Materials, Designation: D–1003–61, "Standard Method of Test for Haze and Luminous Transmittance of Transparent Plastics," pp. 569–576 (1961).

American Society for Testing and Materials, Designation: D–1003–92, "Standard Test Method for Haze and Luminous Transmittance of Transparent Plastics," pp. 357–361 (1992).

American Society for Testing and Materials, Designation: D–1003–97, "Standard Test Method for Haze and Luminous Transmittance of Transparent Plastics," pp. 196–201 (1998).

American Society for Testing and Materials, Designation: D–1044–94, "Standard Test Method for Resistance of Transparent Plastics to Surface Abrasion," pp. 219–222 (1994).

American Society for Testing and Materials, Designation: D 2457–97, "Standard Test Method for Specular Gloss of Plastic Films and Solid Plastics," pp. 9–13 (1997).

American Society for Testing and Materials, Designation: D–2486–89, "Standard Test Method for Scrub Resistance of Interior Latex Flat Wall Paints," pp. 91–93 (1989).

American Society for Testing and Materials, Designation: D–2486–96, "Standard Test Method for Scrub Resistance Wall Paints," pp. 92–94 (196).

American Society for Testing and Materials, Designation: D–3359–90, "Standard Test Methods for Measuring Adhesion by Tape Test," pp. 511–514 (1990).

American Society for Testing and Materials, Designation: D–3359–93, "Standard Test Methods for Measuring Adhesion by Tape Test," pp. 433–438 (1994).

American Society for Testing and Materials, Designation: D–3359–97 ("Standard Test Methods for Measuring Adhesion by Tape Test," pp. 368–374 (1998).

American Society for Testing and Materials, Designation: D–3884–92, "Standard Test Method for Abrasion Resistance of Textile Fabrics (Rotary Platform, Double–Head Method)," pp. 160–164 (1992).

American Society for Testing and Materials, Designation: D–4280–96, "Standard Specification for Extended Life Type, Nonplowable, Prismatic, Raised, Retroreflective Pavement Markers," pp. 430–436 (1996).

American Society for Testing and Materials, Designation: E–810–94, "Standard Test Method for Coefficient of Retroreflection of Retroreflective Sheeting," pp. 362–267 (1994).

American Society for Testing and Materials, Designation: G–26–88, "Standard Practice for Operating Light Exposure Apparatus (Xenon–Arc Type) with and without Water for Exposure of Nonmetallic Materials," pp. 963–971 (1988).

American Society for Testing and Materials, Designation: G–26–90, "Standard Practice for Operating Light–Exposure Apparatus (Xenon–Arc Type) With or Without Water for Exposure of Nonmetallic Materials," pp. 1069–1077 (1990).

American Society for Testing and Materials, Designation: G–26–96, "Standard Practice for Operating Light–Exposure Apparatus (Xenon–Arc Type) With or Without Water for Exposure of Nonmetallic Materials," pp. 1258–1267 (1996).

Floch et al., "A Scratch–Resistant Single–Layer Anti–reflective Coating by a Low Temperature Sol–Gel Route," *SPIE*, vol. 1758, Sol–Gel Optics II, pp. 135–149 (1992).

Iler, "The Chemistry of Silica," John Wiley & Sons, New York, title page, copyright page, table of contents (1979).

Lewis et al., "Ultraviolet–Curable, Abrasion–Resistant and Weatherable Coatings with Improved Adhesion", *J. of Appl. Polymer Science*, 42:1551–1556 (1991).

Pleuddeman, "Silan Coupling Agents," New York, title page, table of contents, pp. 20–23 and 96–99 (1982).

Schmidt, "Chemistry of Material Preparation By The Sol–Gel Process", *J. Non–Cryst. Solids*, 100:51–64 (1988).

Zisman, W. A., "Contact Angle, Wettability and Adhesion," Advances in Chemistry, series 43, American Chemical Society, Washington, D.C. (1964).

American Society for Testing Materials, Designation: D 1000–93, "Standard Test Method for Pressure–Sensitive Adhesive–Coated Tapes Used for Electrical and Electronic Applications," pp. 320–337 (1999).

American Society for Testing Materials, Designation: D 1044–90, "Standard Test Method for Resistance of Transparent Plastics to Surface Abrasion," pp. 378–381 (1991).

American Society for Testing Materials, Designation: D 3359–95a, "Standard Test Methods for Measuring Adhesion by Tape Test," pp. 355–361 (1997).

Zisman, W. A., "Contact Angle, Wettability and Adhesion," Advances in Chemistry, series 43, American Chemical Society, Washington, D.C. (Title page, Publication page, and Table of Contents) (1964).

* cited by examiner-

RETROFLECTIVE ARTICLES INCLUDING A CURED CERAMER COMPOSITE COATING HAVING ABRASION AND STAIN RESISTANT CHARACTERISTICS

RELATED APPLICATION INFORMATION

This application is a continuation-in-part of prior application Ser. No. 09/209,300, filed Dec. 10, 1998, abandoned, which was in turn a continuation-in-part of then-pending 0prior application Ser. No. 09/071,970, filed May 4, 1998, pending.

FIELD OF THE INVENTION

This invention relates to retroreflective articles such as traffic signs, pavement markers, reflectors, and the like. This invention also relates to retroreflective articles comprising a cured ceramer coating that provides the retroreflective article with abrasion and stain resistant characteristics and optional dew resistant characteristics.

BACKGROUND OF THE INVENTION

Retroreflective structures have been incorporated into a wide variety of different articles in order to make such articles more visible under low light conditions. A typical retroreflective structure works by reflecting a substantial portion of incident light back towards the illumination source. As a result, the underlying article or imagery printed on the retroreflective structure is easily seen by an observer in or near the path of the reflected light. For example, one common application for retroreflective articles involves covering the surface of a traffic sign with a layer of retroreflective sheeting. At night, incident light from the headlights of an oncoming motor vehicle bathes the sign in light, which is then reflected back to the driver of the motor vehicle. Information on the sign is easily read as a result.

Of course, traffic signs are not the only application for retroreflective products. Other examples of articles that benefit from retroreflective characteristics include lens elements on pavement markers (particularly raised pavement markings), street name signs, pavement marking tapes, reflectors on bicycles, conspicuity markings for motor vehicles and trains, traffic cones, license plates, self adhesive stickers (such as the validation stickers that are affixed to license plates or windshields), commercial advertising signs, clothing, barrels, barricades, and the like.

On many retroreflective articles, the exposed front surface is formed from thermoplastic or thermosetting polymers. Examples of such polymers include thermosetting or thermoplastic polycarbonate, poly(meth)acrylate (PMMA), ethylene/acrylic acid copolymers (EAA), polyvinyl chloride (PVC), polyurethane, polyester, polyamide, polyimide, phenoxy, phenolic resin, cellulosic resin, polystyrene, styrene copolymer, epoxy, and the like. Many of these thermoplastic and thermosetting polymers have excellent rigidity or flexibility (depending upon the desired application), dimensional stability, and impact resistance, but unfortunately have poor abrasion resistance. Consequently, retroreflective articles incorporating these polymers are susceptible to scratches, abrasion, and similar damage.

To protect the surfaces of retroreflective articles from physical damage, a tough, abrasion resistant "hardcoat" layer may be coated onto one or more portions of the retroreflective surfaces of such articles. Many previously known hardcoat layers incorporate a binder matrix formed from radiation curable prepolymers such as (meth)acrylate functional monomers. Such hardcoat compositions have been described, for example, in Japanese patent publication JP02-260145, U.S. Pat. No. 5,541,049, and U.S. Pat. No. 5,176,943. One particularly excellent hardcoat composition is described in WO 96/36669 A1. This publication describes a hardcoat formed from a "ceramer" used, in one application, to protect the surfaces of retroreflective sheeting from abrasion. As defined in this publication, a ceramer is a hybrid, polymerizable composite (preferably transparent) having inorganic oxide particles, e.g., silica, of nanometer dimensions dispersed in an organic binder matrix.

Many ceramers are derived from aqueous sols of inorganic colloids according to a process in which a radiation curable binder matrix precursor (e.g., one or more different radiation curable monomers, oligomers, or polymers) and other optional ingredients (such as surface treatment agents that interact with the colloids of the sol, surfactants, antistatic agents, leveling agents, initiators, stabilizers, sensitizers, antioxidants, crosslinking agents, and crosslinking catalysts) are blended into the aqueous sol. The resultant composition is then dried to remove substantially all of the water. The drying step sometimes is referred to as "stripping". An organic solvent may then be added, if desired, in amounts effective to provide the composition with viscosity characteristics suitable for coating the composition onto the desired substrate. After coating, the composition can be dried to remove the solvent and then exposed to a suitable source of energy to cure the radiation curable binder matrix precursor.

Light transmission to and from a retroreflective article, such as a traffic sign or a raised pavement marker, can be impaired by water droplets. Dew formation can be particularly problematic, because dew condenses onto signs predominantly at nighttime when the illuminating characteristics of retroreflective sheetings are most beneficial. Water droplets on traffic signs can significantly alter the path of incident and retroreflected light. This can make information on the sign much more difficult for passing motorists to read. Thus, the elimination or reduction of small beaded water droplets on the surface of a sign increases retroreflectance and readability by reducing the extent to which incident light is scattered or otherwise misdirected by water droplets on the surface of a sign.

To hamper water droplet formation in moist conditions, coatings have been applied to signs to evenly spread the water over the coating. Water-spreading coatings typically include inorganic particles and may also include an organic binder. For example, U.S. Pat. No. 4,576,864 to Krautter et al. discloses a water-spreading layer that is composed of colloidal particles of a metal or silicon oxide in which the water-spreading layer is adhered to a plastic substrate by an adhesive. U.S. Pat. Nos. 4,478,909 to Taniguchi et al. and 5,134,021 to Hosono et al. disclose an anti-fogging coating having finely divided silica particles dispersed in a matrix of polyvinyl alcohol and an organosilicon alkoxy compound or hydrolysates thereof. U.S. Pat. No. 4,409,285 to Swerdlow discloses a water-spreading coating containing a mixture of large and small inorganic particles containing colloidal silica or alumina. U.S. Pat. No. 4,481,254 to Fukishima et al. discloses an agricultural plastic film containing an olefin resin and an amorphous hydrated aluminum silicate gel. U.K. Patent Application GB 2,249,041A to the Imperial College of Science, Technology and Medicine, discloses a modified hydrophobic plastic surface that has been subjected to an oxidation treatment and has a surface layer of colloidal hydrous metal oxide. Japanese Patent Kokai Publication No. HEI-3-50288 to Yamagishi et al. discloses an anti-fogging composition containing a mixture of positively charged colloidal silica and alumina particles with a water-soluble aluminum salt and a nonionic surfactant. U.S. Pat. Nos. 5,073,404, 4,844,946 and 4,755,425 to Huang disclose a retroreflective sheeting that has a transparent coating containing colloidal silica and a polymer selected from aliphatic polyurethanes, polyvinyl chloride copolymers and acrylic polymers.

Other water-spreading layers are known that do not require inorganic particles. For example, U.S. Pat. No. 5,244,935 to Oshibe et al. discloses an ultraviolet curable anti-fogging composition agent containing an acrylate or acrylamide block copolymer having a hydrophilic polymer segment and a hydrophobic polymer segment, a photopolymerizable compound, and a photoinitiator. The photopolymerizable compound has the formula $CH_2=CHCOO(CH_2CRHO)_nOCCR=CH_2$; when n=0, anti-fogging properties were not exhibited and when n>30, the resulting film was weak. U.S. Pat. No. 5,316,825 to Nakai et al. discloses an anti-fogging film made of a transparent synthetic resin having micro concavities of at most 10 $\mu$m in depth and 20 $\mu$m in width.

Other workers have reported that anti-fogging properties can be imparted to glass or surface-activated plastic substrates by reacting the substrate surfaces with silanol or siloxane-functionalized polymers or fluoropolymers. European Patent Application No. 0 620 255 A1 to Luckey, Ltd. reports that anti-fogging coatings can be produced from mixtures of an epoxy functionalized organosiloxane, an amino functionalized organosiloxane, a hydrophilic methacrylate monomer, and a curing catalyst. U.S. Pat. No. 5,270,080 to Mino et al. discloses anti-fogging compositions composed of silanol-functionalized fluoropolymers. European Patent Application Nos. 0 491 251 A1 and 0 492 545 A2 to Matsushita Electric Industrial Co. report water-repelling, oil-repelling anti-fogging films that are made from siloxy-functionalized hydrophobic compounds. These references report that plastic surfaces can be made reactive to hydroxyl groups or hydrophilic by corona treating the surface.

Other techniques have resulted in heterogeneous surfaces. U.S. Pat. No. 4,536,420 to Rickert discloses a water-wettable coating made from a mixture of colloidal acrylic resin and colloidal silica which, when cured, has a mud-cracked pattern, thus providing canals in the surface which tend to break up water droplets. Japanese Kokai Patent Publication 59-176,329 to Mitsubishi Monsanto Kasei Vinyl K.K. discloses transparent molded materials having patterned surfaces of hydrophilic and hydrophobic areas. In the examples, a patterned hydrophobic material is printed onto a hydrophilic film.

SUMMARY OF THE INVENTION

The manufacture of ceramer compositions can be challenging due to the extremely sensitive characteristics of the colloids of the aqueous sol. Particularly, adding other ingredients, such as binder matrix precursors or other additives, to such sols tends to destabilize the colloids, causing the colloids to flocculate, e. g., precipitate out of the sol. Flocculation is not conducive to forming high quality coatings. First, flocculation results in local accumulations of particles. These accumulations are typically large enough to scatter light which results in a reduction of the optical clarity of the resultant coating. In addition, the accumulation of particles may cause nibs or other defects in the resultant coatings. In short, flocculation of the colloids causes the resultant ceramer composition to be cloudy, or hazy, and thus, coatings formed from the ceramer composition could be cloudy or hazy as well. Conversely, if colloid flocculation were to be avoided, the resultant ceramer composition would remain optically clear, allowing coatings containing the ceramer composition to be optically clear as well.

Thus, the manufacture of ceramer compositions may require special processing conditions that allow binder precursors or additives to be incorporated into a sol to avoid colloid flocculation. Unfortunately, the processing conditions developed to manufacture one ceramer composition are often not applicable to the manufacture of a ceramer containing different components.

One method of manufacturing ceramers from aqueous, colloidal sols involves incorporating one or more N,N-disubstituted (meth)acrylamide monomers, preferably N,N-dimethyl(meth)acrylamide (hereinafter referred to as "DMA"), into the binder matrix precursor. The presence of such a radiation curable material advantageously stabilizes the colloids, reducing the sensitivity of the colloids to the presence of other ingredients that might be added to the sol. By stabilizing the colloids, the presence of materials like DMA makes ceramers easier to manufacture. In addition to enhancing colloid stability, DMA provides other benefits. For example, ceramer compositions containing DMA show better adhesion to polycarbonate or acrylic substrates and better processability as compared to otherwise identical ceramer compositions lacking DMA.

Unfortunately, the use of DMA also has some drawbacks. A ceramer composition incorporating DMA tends to attract or bind with acidic contaminants (coffee, soda pop, citrus juices, and the like) in the environment. Thus, ceramers incorporating DMA tend to be more vulnerable to staining.

Accordingly, it would be desirable to find an alternative approach for making ceramers without DMA, or with reduced amounts of DMA, such that (1) the colloids are sufficiently stable during ceramer manufacture, (2) the resultant ceramer is stain resistant, or (3) the resultant ceramer retains excellent hardness and abrasion resistance.

Fluorochemicals have low surface energy characteristics that would satisfy at least one of the aforementioned criteria. Specifically, because compositions with lower surface energy generally tend to show better stain resistance, the incorporation of a fluorochemical into a ceramer would be likely to enhance the ceramer's stain resistance. Unfortunately, the incorporation of fluorochemicals into a ceramer sol is extremely difficult. For example, because fluorochemicals are both hydrophobic (incompatible with water) and oleophobic (incompatible with nonaqueous organic substances), the incorporation of a fluorochemical into a ceramer sol often results in phase separation, e.g., colloid flocculation. This undesirable colloid flocculation can also result during the stripping process, when water is typically removed from the blended aqueous sol.

Consequently, it would further be desirable to find a way to provide ceramers with good stain resistance using fluorochemicals or other stain resistant additives, while avoiding compatibility and hardness problems generally associated with fluorochemicals.

Some retroreflective articles are formed through embossing techniques in which information is embossed onto an article in which retroreflective sheeting covers a surface of the article. For example, license plate blanks have a retroreflective sheet bonded to an underlying substrate. License plate numbers are formed in the blank using embossing techniques. Accordingly, if a ceramer coating is provided on retroreflective sheeting intended to be used in the manufacture of license plates, the ceramer must have sufficient stretchability (e. g., toughness or impact resistance) to be embossed without cracking. Stretchability of ceramer coatings is also important in other applications in which the retroreflective article is to be attached to an irregular surface (e.g., a road pavement surface) or that will be subjected to flexing stresses during use. For example, a ceramer coating preferably has stretchability if the corresponding retroreflective article is to be attached to a traffic cone or to a curved sidewall of a motor vehicle. Additionally, retroreflective sheeting used in a lens of a raised pavement marker preferably is sufficiently stretchable to withstand flexing stresses when contacted by vehicle tires traversing, impacting, or hitting the pavement marker.

In addition, depending upon the intended use, it is highly desirable if the surface of a retroreflective article is receptive to printing with some kinds of inks and colorants to create graphic patterns on articles such as license plates, stickers, emblems, and the like. Yet, it is also desirable if these same articles are stain resistant at the same time so that undesired inks and colorants, e.g., graffiti, can be easily removed.

The present invention relates to retroreflective articles having a hard, abrasion resistant, protective ceramer coating that is stain resistant, avoids the use of DMA if desired, and shows excellent bonding to a wide range of polymer surfaces. Additionally, the ceramer coatings of the present invention can be easily treated to provide excellent dew resistant and anti-fogging characteristics. Flexible embodiments of the invention may also be made so that the ceramer coating may be used in applications in which some stretchability is needed to avoid delamination, cracking, or other damage when the corresponding retroreflective article is subjected to flexural stresses.

The present invention is based, at least in part, upon the finding that a nonionic fluorochemical containing both a fluorinated moiety and a hydrolyzable silane moiety (fluoro/silane component) can be successfully incorporated into a ceramer sol, without causing appreciable colloid flocculation, to provide ceramer coatings with surprisingly long shelf lives and excellent stain resistant characteristics. Ceramers incorporating such a fluorochemical also retain a high level of abrasion resistance and hardness when coated onto a substrate to form a coated retroreflective article. In some embodiments, the ceramer coating forms a protective coating over an underlying, wholly functional retroreflective structure. In other embodiments, the ceramer coating may complete the optics of the retroreflective structure.

As another advantage, even though the ceramer coating is stain resistant, the ceramer coating may nonetheless be very compatible with certain kinds of inks and colorants allowing information, data, or graphics to be easily incorporated into retroreflective articles of the present invention. In one embodiment, such inks may be applied onto the substrate first and then overcoated with the ceramer coating. In this embodiment, a very wide variety of inks or colorants may be used, and the ceramer coating will protect the applied inks or colorants from being damaged to a much greater extent than if no ceramer coating were to be used.

However, the present invention is not limited to applications in which the ceramer coating merely overcoats underlying inks or colorants. Indeed, the surface of the cured ceramer coating is compatible to receiving certain kinds of inks and colorants so that information, data, or graphics can be applied directly onto the cured ceramer coating with a high level of permanency. Examples of compatible inks and colorants include 3M SCOTCHLITE™ Roll Coat Paste Series 4800, hot stamping foil as discussed in U.S. Pat. No. 5,393,590, colorants as disclosed in U.S. Pat. Nos. 5,706,133 and 4,440,590, and the like. Other inks or colorants, however, such as the inks used in SHARPIE brand permanent markers and Red and Black Magic Ink (available from Magic Ink Company, Japan) are not very compatible with the ceramer coating and can be easily removed from the coating using a suitable solvent such as toluene, xylene, ethyl acetate, isopropanol, methylethyl ketone, or the like. The ability of many common types of inks and paints to be easily removed from the coatings allows the pristine character of coated traffic signs or the like to be maintained over time, notwithstanding the tendency of some members of society to adorn signage with unwanted graffiti.

The present invention involved not just discovering the advantages offered by the fluoro/silane component, but also involved developing processing techniques that would allow the fluoro/silane component to be incorporated into the sol without causing flocculation of the colloids. Flocculation can be substantially prevented if the fluoro/silane component is added to an admixture containing a colloidal inorganic oxide and a curable binder precursor (the "first admixture") in the presence of a surface treatment agent containing both a hydrolyzable silane moiety and a polymerizable moiety (a "crosslinkable silane component"). The fluoro/silane component and the crosslinkable silane component may be combined to form a second admixture, which is then combined with the first admixture to form a third admixture which after stripping will provide a curable ceramer composition of the present invention. Alternatively, the crosslinkable silane component may be combined with the first admixture individually, after which the fluoro/silane component may then be added. In contrast, if the fluoro/silane component is added to the sol individually in the absence of, e.g., before, the crosslinkable silane component, colloid flocculation tends to occur as soon as the crosslinkable silane component is added or during stripping. The effects caused by the order of addition of the crosslinkable silane and the fluoro/silane tend to be observed in larger scale processes rather than in bench scale processes. In bench scale processes, it may be possible to add the fluoro/silane component to the sol in the absence of the crosslinkable silane without observing appreciable flocculation.

Accordingly, in one aspect, the present invention relates to a retroreflective article having a substrate and a coating provided on at least a portion of a surface of the substrate. The coated portion of the surface is retroreflective. The coating contains a cured ceramer composite derived from ingredients containing a free-radically-curable binder precursor and a surface treated, colloidal inorganic oxide. The colloidal inorganic oxide surface treatment agent preferably contains a fluoro/silane component containing a hydrolyzable silane moiety and a fluorinated moiety, and a crosslinkable silane component containing a hydrolyzable silane moiety and a free-radically crosslinkable moiety.

The substrate itself may include a wholly functional retroreflective structure to provide the desired retroreflective characteristics, or retroreflectivity may result only after the ceramer coating is applied onto the substrate to complete the retroreflective optics. In embodiments in which the substrate includes a retroreflective structure, any kind of retroreflective structure can be used as desired. For example, the retroreflective structure may be in the form of cube corner retroreflective sheeting, encapsulated lens retroreflective sheeting, embedded lens retroreflective sheeting, or the like.

In preferred embodiments, the uncured ceramer composition is provided by combining the fluoro/silane component with a first admixture containing a colloidal inorganic oxide and a curable binder precursor wherein the curable binder precursor contains a polymerizable moiety copolymerizable with the polymerizable moiety of the crosslinkable silane component. This combining step occurs in the presence of the crosslinkable silane component. The combining step further occurs under conditions such that at least a portion of the colloidal inorganic oxide is surface treated by the fluoro/silane component.

DETAILED DESCRIPTION

The embodiments of the present invention described below are not intended to be exhaustive or to limit the invention to the precise forms disclosed in the following detailed description. Rather the embodiments are chosen and described so that others skilled in the art may appreciate and understand the principles and practices of the present invention.

One embodiment of a preferred ceramer composition of the present invention is prepared from ingredients containing a compound having at least one hydrolyzable silane moiety and at least one fluorinated moiety ("fluoro/silane component"), a compound having at least one hydrolyzable silane moiety and at least one polymerizable moiety other than a silane moiety ("crosslinkable silane component"), a curable binder precursor having at least one polymerizable moiety that is co-polymerizable with the polymerizable moiety of the crosslinkable silane component, and one or more colloidal inorganic oxides. Preferably, the fluoro/silane component and the crosslinkable silane component are nonionic in embodiments of the invention in which the colloidal inorganic oxide is provided as a sol. The use of nonionic materials minimizes the tendency of the colloids to flocculate when the ingredients are combined. Preferably, the polymerizable moieties of the crosslinkable silane component and the curable binder precursor are free-radically-curable.

A wide range of these materials may be incorporated into the ceramer composition with beneficial results. Preferably, the composition includes from about 4 to about 20 parts by weight of the crosslinkable silane component per 1 part by weight of the fluoro/silane component. It is additionally preferred that the composition includes from about 10 to about 100, more preferably from about 10 to about 80, parts by weight of the curable binder precursor per 100 parts by weight (including the weight of the dispersant or other liquid medium) of the colloidal inorganic oxide. It is also preferred that the composition includes about 1 to about 20 parts by weight of the crosslinkable silane and fluoro/silane components per 100 parts by weight of the colloidal inorganic oxide (again including the weight of the dispersant or other liquid medium). In embodiments of the invention in which the colloidal inorganic oxide is provided as a sol, e.g., an aqueous sol, the sol preferably includes about 2 to about 50, more preferably about 20 to about 50 percent by weight of the colloids.

Expressed on a solids basis, the ceramer compositions of the invention preferably contain about 50 to about 60 weight percent curable binder precursor and about 35 to about 40 weight percent colloidal inorganic oxide solids, with the balance (totaling about 5 to about 10 weight percent) being crosslinkable silane and fluoro/silane.

Suitable fluoro/silane components include those having at least one hydrolyzable or hydrolyzed group and a fluorochemical group. Additionally, suitable fluoro/silane components can be polymers, oligomers, or monomers and typically contain one or more fluorochemical moieties that contain a fluorinated carbon chain having from about 3 to about 20 carbon atoms, more preferably from about 6 to about 14 carbon atoms. These fluorochemical moieties can contain straight chain, branched chain, or cyclic fluorinated alkylene groups or any combination thereof. The fluorochemical moieties are preferably free of polymerizable olefinic unsaturation but can optionally contain catenary (in-chain) heteroatoms such as oxygen, divalent or hexavalent sulfur, or nitrogen. Perfluorinated groups are preferred, but hydrogen or halogen atoms can also be present as substituents, provided that no more than one atom of either is present for every two carbon atoms.

A class of useful fluoro/silane components can be represented by the following general formula:

  (1)

In this formula, $S_y$ represents a hydrolyzable silane moiety; $R_f$ represents a fluorinated moiety; r is at least 1, preferably 1–4, more preferably 1; s is at least 1, preferably 1–4, more preferably 1; and W is a linking group having a valency of r+s.

Preferably, each $R_f$ moiety of Formula (1) independently is a monovalent or divalent, nonionic, perfluoro moiety that may be linear, branched, or cyclic. If $R_f$ is divalent, both valent sites of such an $R_f$ moiety preferably are linked to W directly as illustrated by the following formula:

  (2)

From Formula (2), it can be seen that each divalent $R_f$ moiety bonds to two valent sites on W. Accordingly, s of Formula (1) is incremented by 2 for each such divalent moiety.

Any of a wide variety of nonionic perfluoro moieties are suitable for use as $R_f$. Representative examples of suitable perfluoro moieties include perfluoroalkyl, perfluoroalkylene, perfluoroalkoxy, or oxyperfluoroalkylene moieties having about 1 to about 20, preferably about 3 to about 20 carbon atoms. Perfluorinated aliphatic moieties are the most preferred perfluoro moieties.

Preferably, each $S_y$ moiety of Formula (1) independently is a monovalent or divalent, nonionic hydrolyzable silane moiety that may be linear, branched, or cyclic. The term "hydrolyzable silane moiety" refers to a hydrolyzable moiety containing at least one Si atom bonded to at least one halogen atom or at least one oxygen atom in which the oxygen atom preferably is a constituent of an acyloxy group or an alkoxy group. Thus, representative examples of preferred hydrolyzable silane moieties suitable for use as $S_y$ may be represented by the following formulae:

  (3)

  (4)

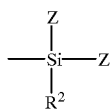

(5)

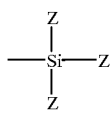

(6)

Generally, $R^1$ and $R^2$ independently may be any nonionic, monovalent substituent other than hydrogen. Additionally, $R^1$ and $R^2$ may be linear, branched, or cyclic. In embodiments according to Formula (4), $R^1$ and $R^2$ may be co-members of a ring structure. Thus, representative examples of moieties suitable for use as $R^1$ and $R^2$ include any alkyl, aryl, alkaryl, acyl, alkenyl, arylene or heterocyclic moieties, combinations thereof, or the like. Any of such moieties, if cyclic, may include a plurality of rings if desired. For example, aryl moieties may be aryl-aryl structures. In preferred embodiments, each of $R^1$ and $R^2$ is independently an alkyl group of 1 to 4 carbon atoms or an acyl group such as acetyl ($CH_3CO-$) or substituted or unsubstituted benzoyl ($C_6H_5CO-$). Most preferably each of $R^1$ and $R^2$ independently is a lower alkyl group of 1 to 4 carbon atoms, more preferably $CH_3-$.

Z is preferably a halogen atom or $-OR^3$. In embodiments in which $-OR^3$ is an alkoxy group, $R^3$ preferably is an alkyl group of 1 to 8, more preferably 1 to 4, and most preferably 1 to 2 carbon atoms. In embodiments in which $-OR^3$ is an acyloxy group, $R^3$ preferably has the formula $-C(O)R^4$, wherein $R^4$ generally may be any nonionic, monovalent moiety other than hydrogen. Representative examples of moieties suitable as $R^4$ include any alkyl, aryl, or alkaryl moieties, and combinations thereof. Any of such $R^4$ moieties, if cyclic, may include a plurality of rings if desired. In preferred embodiments, $R^4$ is $CH_3-$.

Generally, W of Formula (1) may be any nonionic moiety capable of linking the at least one $S_y$ moiety and the at least one $R_f$ moiety together. Preferably, W contains a backbone of 4 to 30 atoms and may contain one or more moieties such as an alkylene moiety, an ether moiety, an ester moiety, a urethane moiety, a carbonate moiety, an imide moiety, an amide moiety, an aryl moiety, an alkaryl moiety, an alkoxyaryl moiety, sulfonyl, nitrogen, oxygen, combinations of these, and the like.

A preferred class of compounds according to Formula (1) is represented by any of the formulae

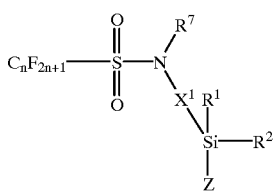

(7)

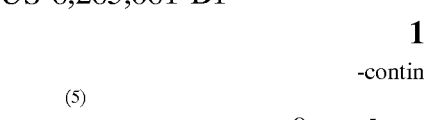

(8)

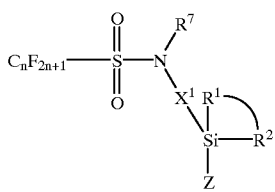

(9)

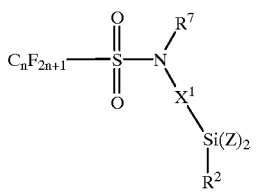

(10)

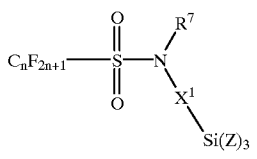

wherein n is 1 to 20, preferably 3 to 20; $R^7$ is a monovalent moiety, preferably an aryl, alkyl, or alkyaryl moiety, more preferably an alkyl moiety of 1 to 4 carbon atoms; $X^1$ is an alkylene group of 1 to 10 carbon atoms, and Z, $R^1$, $R^2$ and $R^3$ are as defined above.

Representative specific examples of preferred compounds according to Formula (1) including the following compounds:

$C_5F_{11}CH_2OCH_2CH_2CH_2Si(OCH_2CH_3)_3$ $C_7F_{15}CH_2OCH_2CH_2CH_2Si(OCH_2CH_3)_3$ $C_7F_{15}CH_2OCH_2CH_2CH_2SiCl_3$ $C_8F_{17}CH_2CH_2OCH_2CH_2CH_2SiCl_3$ $C_{18}F_{37}CH_2OCH_2CH_2CH_2CH_2SiCl_3$ $CF_3CF(CF_2Cl)CF_2CF_2SO_2N(CH_3)CH_2CH_2CH_2SiCl_3$ $C_8F_{17}SO_2N(CH_2CH_3)CH_2CH_2CH_2Si(OCH_3)_3$ $C_8F_{17}SO_2N(CH_3)CH_2CH_2CH_2Si(OCH_3)_3$ $C_8F_{17}SO_2N(CH_2CH_3)CH_2CH_2CH_2Si(OCH_3)_{av1.9}$
$[(OCH_2CH_2)_{av6.1}OCH_3]_{av1.1}$ $C_7F_{15}CH_2O(CH_2)_3Si(OCH_2CH_2OCH_2CH_2OH)_3$ $C_7F_{15}CH_2CH_2Si(CH_3)Cl_2$ $C_8F_{17}CH_2CH_2SiCl_3$ $Cl_3SiCH_2CH_2CH_2OCH_2(OCF_2CF_2)_8CH_2OCH_2CH_2CH_2SiCl_3$ $CF_3O(CF_2CF(CF_3)OOCF_2C(=O)NHCH_2CH_2CH_2Si(OC_2H_5)_3$ $CF_3O(C_3F_6O)_4(CF_2O)_3CF_2CH_2OC(=O)NHCH_2CH_2CH_2Si(OCH_3)_3$ $Cl_3SiCH_2CH_2OCH_2(CF_2CF_2O)_8(CF_2O)_4CF_2CH_2CH_2CH_2SiCl_3$ $C_8F_{17}CONHC_6H_4Si(OCH_3)_3$ $C_8F_{17}SO_2N(CH_2CH_3)CH_2CH_2CH_2Si(OCH_3)_{av1}$
$(OCH_2CH_2(OCH_2CH_2)_2OCH_3)_{av2}$

A particularly preferred embodiment of a fluoro/silane component according to Formula (1), for example, is represented by the formula

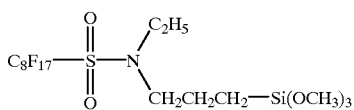

(11)

The compound according to Formula (11) is commercially available from Minnesota Mining and Manufacturing Company, St. Paul, Minn. under the trade designation FC405. Methods of making such a compound and fluoro/silane compounds in general are described in U.S. Pat. No. 3,787,467 to Lucking et al., the disclosure of which is herein incorporated by reference.

Useful fluoro/silane components can be prepared, e.g., by reacting (a) at least one fluorochemical compound having at least one reactive functional group with (b) a functionalized silane having from one to about three hydrolyzable groups and at least one alkyl, aryl, or alkoxyalkyl group that is substituted by at least one functional group that is capable of reacting with the functional group of the fluorochemical compound(s). Such methods are disclosed in U.S. Pat. No. 5,274,159 (Pellerite et al.).

Crosslinkable silane components suitable for use in the ceramer composition of the present invention are commercially available from numerous sources. Generally, suitable crosslinkable silane components contain at least one hydrolyzable silane moiety and at least one polymerizable moiety other than a silane moiety. The polymerizable moiety preferably contains either (meth)acrylate, allyl, styryl, amino, or epoxy functionalities, while the hydrolyzable silane group is usually an alkoxy silyl moiety (generally methoxy or ethoxy) which serves as a binding site to hydroxy-functional inorganic substrates via displacement of the alkoxy groups. Additional information concerning crosslinkable silane components may be found in the book by E. P. Pleuddeman ("Silane coupling Agents", Plenum Press, New York, 1982, pp. 20–23 and 97) as well as in technical reports by S. Sterman and J. G. Marsden entitled "Theory of Mechanisms of Silane Coupling Agents in Glass Reinforced and Filled Thermoplastic and Thermosetting Resin Systems", Union Carbide Corporation, New York, and "A Guide to Dow Corning Silane Coupling Agents", Dow Corning Corporation, 1985, pp. 2–13, the disclosures of which are incorporated by reference herein.

Crosslinkable silane components suitable for use in the ceramer compositions of the present invention may be polymers, oligomers, or monomers and may preferably be represented by the formula

(12)

In Formula (12), $S_y$ represents a hydrolyzable silane moiety as defined above with respect to Formulae (1) and (2); $R_c$ is a moiety having curable functionality, preferably free-radically-curable functionality; q is at least 1, preferably 1 to 4, more preferably 1; p is at least 1, preferably 1 to 4, more preferably 1; and $W^o$ is a linking group having a valency of q+p. Compounds according to Formula (12) and methods of making such compounds are described in U.S. Pat. No. 5,314,980, the disclosure of which is incorporated by reference herein.

Generally, $W^o$ of Formula (12) may be any nonionic moiety capable of linking the at least one $S_y$ moiety and the at least one $R_c$ moiety together. Preferably, $W^o$ has a backbone of 4 to 30 atoms and may contain one or more moieties such as an alkylene moiety, an ether moiety, an ester moiety, a urethane moiety, a carbonate moiety, an imide moiety, an amide moiety, an aryl moiety, an alkaryl moiety, an alkoxyaryl moiety, arylsulfonyl moiety, nitrogen, oxygen, combinations of these, and the like.

Embodiments of compounds according to Formula (12) in the form of silane functional (meth)acrylates include, for example, 3-(methacryloxy)propyl trimethoxysilane, 3-acryloxypropyl trimethoxysilane, 3-(methacryloxy)propyltriethoxysilane, 3-(methacryloxy)propylmethyldimethoxysilane, 3-(acryloxypropyl)methyldimethoxysilane, 3-(methacryloxy)propyldimethylethoxysilane, 3-(methacryloxy)methyltriethoxysilane, 3-(methacryloxy)methyltrimethoxysilane, 3-(methacryloxy)propyldimethylethoxysilane, 3-methacryloxypropenyl trimethoxysilane, vinyldimethylethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltrisisobutoxysilane, vinyltriisopropenoxysilane, vinyltris(2-methoxyethoxy)silane, and mixtures thereof. Of these, 3-(methacryloxy)propyl trimethoxysilane, 3-acryloxypropyl trimethoxysilane, 3-(methacryloxy)propylmethyldimethoxysilane and 3-(methacryloxy)propyldimethylethoxysilane are preferred. Furthermore, embodiments of crosslinkable silane components according to Formula (18) in the form of silane functional polyolefins can be produced from commercially available starting materials by any of several methods.

Exemplary crosslinkable silane components are described in the above-mentioned Pleuddeman reference and in U.S. Pat. Nos. 4,491,508 and 4,455,205 to Olsen et al.; U.S. Pat. Nos. 4,478,876 and 4,486,504 to Chung; and U.S. Pat. No. 5,258,225 to Katsamberis, all of which are incorporated herein by reference.

In the practice of the present invention, free-radically-curable functionality refers to frictional groups directly or indirectly pendant from a monomer, oligomer, or polymer backbone (as the case may be) that participate in crosslinking or polymerization reactions upon exposure to a suitable source of radiant (e.g., UV or thermal) curing energy. Such functionality generally includes not only groups that crosslink via a cationic mechanism upon radiation exposure but also groups that crosslink via a free radical mechanism. Representative examples of radiation polymerizable moieties suitable in the practice of the present invention include epoxy groups, (meth)acrylate groups, olefinic carbon-carbon double bonds, allylether groups, styrene groups, (meth)acrylamide groups, combinations of these, and the like. Representative examples of curing energy include electromagnetic energy (e.g., infrared energy, microwave energy, visible light, ultraviolet light, and the like), accelerated particles (e.g., electron beam energy), or energy from electrical discharges (e.g., coronas, plasmas, glow discharge, or silent discharge).

The colloidal inorganic oxides for use in the present invention include particles, powders, and oxides in solution. The colloidal inorganic oxides are desirably substantially spherical in shape, and relatively uniform in size (e.g., they have a substantially monodisperse size distribution or a polymodal distribution obtained by blending two or more substantially monodisperse distributions). It is further preferred that the colloidal inorganic oxide be and remain substantially non-aggregated (substantially discrete), as colloidal aggregation can result in precipitation, gellation, or a dramatic increase in sol viscosity and can reduce both adhesion to the substrate and optical clarity. Finally, it is preferable that the colloidal inorganic oxide be characterized by an average particle diameter of about 1 nanometer to about 200 nanometers, preferably from about 1 nanometer to about 100 nanometers, more preferably from about 2 nanometers to about 75 nanometers. These size ranges facilitate dispersion of the particles into coatable ceramer compositions and provide ceramer coatings that are smoothly surfaced and optically clear. Average particle size of the colloids can be measured using transmission electron microscopy to count the number of particles of a given diameter.

A wide range of colloidal inorganic oxides can be used in the present invention. Representative examples include colloidal titania, colloidal alumina, colloidal zirconia, colloidal vanadia, colloidal chromia, colloidal iron oxide, colloidal antimony oxide, colloidal tin oxide, and mixtures thereof. The colloidal inorganic oxide can be a single oxide such as silica, a combination of oxides such as silica and aluminum oxide, or a core of an oxide of one type (or a core of a material other than a metal oxide) on which is deposited an oxide of another type.

In one preferred embodiment, for example, the colloidal inorganic oxide may be a mixture containing a major amount of a first or primary inorganic oxide, e.g., silica, and a minor amount of a second or additive inorganic oxide, preferably an aluminum oxide such as a sodium aluminate. As used herein, "major amount" means that the inorganic oxide includes a sufficient amount of the primary oxide (preferably at least about 80% by weight, more preferably at least about 95% by weight, and most preferably at least about 98% by weight) such that the composite properties of the resultant ceramer are primarily due to such primary oxide. "Minor amount" means that the inorganic oxides include a sufficient amount of the additive oxide to enhance at least one property of the resultant uncured or cured ceramer composition.

It has now been discovered that it is much easier homogeneously to disperse inorganic oxides in uncured ceramer compositions or within sols from which the ceramers are to be derived when the inorganic oxide includes both a primary inorganic oxide and at least one additive inorganic oxide. For example, cured ceramer coatings incorporating silica and aluminum oxide particles have shown better abrasion resistance and improved processability than otherwise identical ceramer coatings having no additive oxide.

The optimum amount of an additive oxide to be incorporated into a ceramer composition will depend upon a number of factors including the type(s) of additive oxide(s) being used, the desired end use of the ceramer composition, and the like. Generally, if too little of an additive oxide is used, little benefit will be observed. On the other hand, if too much of an additive oxide is used, then the resultant cured ceramer coating may be hazier than desired, and abrasion resistance may be reduced. As one suggested guideline for preferred embodiments in which the corresponding cured ceramer coating is desired to be optically clear, abrasion resistant, and weather resistant, the ceramer composition may include about 100 parts by weight of silica and about 0.01 to about 5, preferably about 1 to about 2 parts by weight of an oxide other than silica, preferably an aluminum oxide.

The colloidal inorganic oxide is desirably provided in the form of a sol (e.g., a colloidal dispersion of inorganic oxide particles in liquid media), especially sols of amorphous silica. Unlike other forms in which the colloidal inorganic oxide may be supplied (e.g., fumed silica which contains irregular aggregates of colloidal particles), colloids of such sols tend to be substantially monodisperse in size and shape and thus enable the preparation of ceramer compositions exhibiting good optical clarity, smoothness, and surprisingly good adhesion to substrates. Preferred sols generally contain from about 2 to about 50 weight percent, preferably from about 25 to about 45 weight percent, of colloidal inorganic oxide.

Sols useful in the practice of the present invention may be prepared by methods well known in the art. For example, silica hydrosols containing from about 2 to about 50 percent by weight of silica in water are generally useful and can be prepared, e.g., by partially neutralizing an aqueous solution of an alkali metal silicate with base to a pH of about 8 or about 9 (such that the resulting sodium content of the solution is less than about 1 percent by weight based on sodium oxide). Sols useful in the practice of the present invention may also be prepared in a variety of forms, including hydrosols (where water serves as the liquid medium), organosols (where organic liquids are used as the liquid medium), and mixed sols (where the liquid medium contains both water and an organic liquid). See, e.g., the descriptions of the techniques and forms given in U.S. Pat. Nos. 2,801,185 (Iler) and 4,522,958 (Das et al.), which descriptions are incorporated herein by reference, as well as those given by R. K. Iler in *The Chemistry of Silica,* John Wiley & Sons, New York (1979).

Due to their low cost, and due to environmental considerations, silica hydrosols (also known as aqueous silica sols) are preferred for use in preparing the ceramer compositions of the invention. The surface chemistry of hydrosols makes them particularly well suited for use in the ceramer compositions of the present invention. For example, when colloidal inorganic oxide particles are dispersed in water, the sol is stabilized to some degree due to common electrical charges that develop on the surface of each particle. The common electrical charges tend to promote dispersion rather than agglomeration or flocculation, because the similarly charged particles repel one another.

Hydrosols are commercially available in both acidic and basic forms and with a variety of particle sizes and concentrations under such trademarks as "LUDOX" (E. I. DuPont de Nemours and Co., Inc. Wilmington, Del.), "NYACOL" (Nyacol Co., Ashland, Mass.), and "NALCO" (Nalco Chemical Co., Oak Brook, Ill.). Additional examples of suitable colloidal silicas are described in U.S. Pat. No. 5,126,394, incorporated herein by reference. Although either acidic or basic sols are suitable for use in the ceramer compositions of the present invention, it is desirable to match the pH of the sol with that of the curable binder precursor in order to minimize the tendency of the colloids of the sol to flocculate when the sol and the curable binder precursor are combined. For example, if the sol is acidic, the curable binder precursor also preferably is acidic. On the other hand, if the sol is basic, the curable binder precursor also preferably is basic.

In one preferred ceramer embodiment of the present invention to be derived from an aqueous silica sol, it may be desirable to add a minor amount of a water-soluble compound such as sodium aluminate (NaAlO2) to the sol. Addition of a compound such as sodium aluminate provides a sol, and corresponding ceramer composition, that include both silica colloid and aluminum oxide components. Use of an additive oxide such as aluminum oxide makes it easier to obtain homogeneous ceramer compositions, and provides improved abrasion resistance, improved adhesion in wet or dry environments and improved weatherability. This is believed to be attributable to the enhanced hydrolytic stability of ceramer composites including silica colloids and aluminum oxide components.

The sols may include counterions in order to counter the surface charge of the colloids. Depending upon pH and the type of colloids being used, the surface charges on the colloids can be negative or positive. Thus, either cations or anions are used as counter ions. Examples of cations suitable for use as counter ions for negatively charged colloids include $Na^+$, $K^+$, $Li^+$, a quaternary ammonium cation such as $NR'^{4+}$ (wherein each R' may be any monovalent moiety, but is preferably H or lower alkyl such as $CH_3$), combinations of these, and the like. Examples of counter anions suitable for use as counter ions for positively charged colloids include $HSO_3^-$ and $R-COO^-$, where R represents an alkyl carboxylate.

As one option, suitable curable binder precursors can be selected from any curable thermoplastic or thermosetting polymer that contains moieties capable of crosslinking with the $R_c$ (refer to Formula (12)) moiety of the crosslinkable silane component. Examples of such polymers include polyurethane, polycarbonate, polyester, polyamide, polyimide, phenoxy, phenolic resin, cellulosic resin, polystyrene, styrene copolymer, poly(meth)acrylate, epoxy, silicone resin, combination of these, and the like. As another option, the curable binder precursor can be in the form of prepolymeric materials which can be copolymerized or homopolymerized in situ after the ceramer composition has been coated onto a substrate.

As one example of an approach using prepolymeric materials, the curable binder precursor may contain one or more free-radically-curable monomers, oligomers, polymers, or combinations of these having pendant free-radically-curable functionality which allows the materials to polymerize or crosslink using a source of curing energy such as electron beam radiation, ultraviolet radiation, visible light, and the like. Preferred free-radically-curable monomers, oligomers, or polymers each include one or more free-radically-curable, carbon-carbon double bonds such that the average functionality of such materials is greater than one free-radically-curable carbon-carbon double bond per molecule. Materials having such moieties are capable of copolymerization or crosslinking with each other via such carbon-carbon double bond functionality.

Generally, the term "monomer" as used herein refers to a single, one unit molecule capable of combination with itself or other monomers to form oligomers or polymers. The term "oligomer" refers to a compound that is a combination of 2 to 20 monomers. The term "polymer" refers to a compound that is a combination of 21 or more monomers.

Generally, ceramer compositions including oligomeric or polymeric free-radically-curable binder precursors tend to have higher viscosities than ceramer compositions including only monomeric free-radically-curable binder precursors. Accordingly, in applications involving techniques such as spin coating or the like in which it is desirable for the ceramer composition to have a low viscosity, e.g., a viscosity of less than about 200 centipoise measured at about 25° C. using a Brookfield viscometer with any suitable spindle operated at a spindle speed in the range from about 20 to about 50 rpm, it is preferred that at least about 50%, by weight, more preferably substantially all, of any prepolymeric binder precursors are monomeric free-radically-curable binder precursors.

Free-radically-curable monomers suitable in the practice of the present invention are preferably selected from combinations of mono, di, tri, tetra, penta, and hexafunctional free-radicaliy-curable monomers. Various amounts of the mono, di, tri, tetra, penta, and hexafunctional free-radically-curable monomers may be incorporated into the present invention, depending upon the desired properties of the final ceramer coating.

For example, in order to provide ceramer coatings with higher levels of abrasion and impact resistance, it is desirable for the ceramer composition to include one or more multifunctional free-radically-curable monomers, and preferably at least both di- and tri-functional free-radically-curable monomers, such that the free-radically-curable monomers incorporated into the ceramer composition have an average free-radically-curable functionality per molecule of greater than 1. Preferred ceramer compositions of the present invention may include about 1 to about 35 parts by weight of monofunctional free-radically-curable monomers, about 0 to about 75 parts by weight of difunctional free-radically-curable monomers, about 1 to about 75 parts by weight of trifunctional free-radically-curable monomers, about 0 to about 75 parts by weight of tetrafunctional free-radically-curable monomers, about 0 to about 75 parts by weight of pentafunctional free-radically-curable monomers, and about 0 to about 75 parts by weight of hexafunctional free-radically-curable monomers, subject to the proviso that the free-radically-curable monomers have an average functionality of greater than 1, preferably about 1.1 to about 4, more preferably about 1.5 to about 3.

One representative class of monofunctional free-radically-curable monomers suitable in the practice of the present invention includes compounds in which a carbon-carbon double bond is directly or indirectly linked to an aromatic ring. Examples of such compounds include styrene, alkylated styrene, alkoxy styrene, free-radically-curable naphthalene, alkylated vinyl naphthalene, alkoxy vinyl naphthalene, combinations of these, and the like. Another representative class of monofunctional, free-radically-curable monomers includes compounds in which a carbon-carbon double bond is attached to an cycloaliphatic, heterocyclic, or aliphatic moiety such as 5-vinyl-2-norbornene, 4-vinyl pyridine, 2-vinyl pyridine, 1-vinyl-2-pyrrolidinone, 1-vinyl caprolactam, 1-vinylimidazole, N-vinyl formamide, and the like.

Another representative class of such monofunctional free-radically-curable monomers include (meth)acrylate-functional monomers that incorporate moieties of the formula:

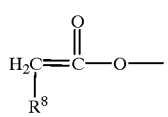

(13)

wherein $R^8$ is a monovalent moiety, such as hydrogen, halogen, methyl, or the like. Representative examples of such monomers include linear, branched, or cycloaliphatic esters of (meth)acrylic acid containing from 1 to 20, preferably 1–8, carbon atoms, such as methyl (meth)acrylate, n-butyl (meth)acrylate, t-butyl (meth)acrylate, ethyl (meth)acrylate, isopropyl (meth)acrylate, and 2-ethylhexyl (meth)acrylate; vinyl esters of alkanoic acids wherein the alkyl moiety of the alkanoic acids contain 2 to 20, preferably 2 to 4, carbon atoms and may be linear, branched, or cyclic; isobornyl (meth)acrylate; vinyl acetate; allyl (meth)acrylate, and the like.

Such (meth)acrylate-functional monomers may also include other kinds of reactive functionality such as hydroxyl functionality, nitrile functionality, epoxy functionality, carboxylic functionality, thiol functionality, amine functionality, sulfonyl functionality, combinations of these, and the like. Representative examples of such free-radically-curable compounds include glycidyl (meth)acrylate, (meth)acrylonitrile, β-cyanoethyl(meth)acrylate, 2-cyanoethoxyethyl (meth)acrylate, p-cyanostyrene, p-(cyanomethyl)styrene, an ester of an α,β-unsaturated carboxylic acid with a diol, e.g., 2-hydroxyethyl(meth)acrylate, or 2-hydroxypropyl (meth)acrylate; 1,3-dihydroxypropyl-2-(meth)acrylate; 2,3-dihydroxypropyl-1-(meth)acrylate; an adduct of an α,β-unsaturated carboxylic acid with caprolactone; an alkanol vinyl ether such as 2-hydroxyethyl vinyl ether; 4-vinylbenzyl alcohol; allyl alcohol; p-methylol styrene, (meth)acryloyloxyethyl trimethyl ammonium chloride, (meth)acrylamidopropyl trimethylammonium chloride, vinylbenzyl trimethylammonium chloride, 2-hydroxy-3-allyloxypropyl trimethylammonium chloride, (meth)acryloxypropyl dimethylbenzylammonium chloride, dimethylaminoethyl (meth)acrylate, vinylbenzyl trimethylammonium chloride, N-(3-sulfopropyl)-N-(meth)acryloxyethyl-N,N-dimethylammonium betaine, 2-[(meth)acryloxy]ethyl trimethylammonium methosulfate, N-(3-sulfopropyl)-N-(meth)acrylamidopropyl-N,N-dimethylammonium betaine, N,N-dimethylamino(meth)acrylate, (meth)acryloyloxyethyl acid phosphate, (meth)acrylamidopropyl sodium sulfonate, sodium styrene sulfonate, styrene sulfonic acid, (meth)acrylic acid, maleic acid, fumaric acid, maleic anhydride, vinyl sulfonic acid, 2-(meth)acrylamide-2-methyl-1-propanesulfonic acid, maleic anhydride, mixtures thereof, and the like.

Another class of monofunctional, free-radically-curable monomers that may optionally be used in the practice of the present invention, but is in no way required, includes one or more N,N-disubstituted (meth)acrylamides. Use of an N,N-disubstituted (meth)acrylamide provides numerous advantages. For example, the use of this kind of monomer provides ceramer coatings which show improved adhesion to polycarbonate substrates. Further, use of this kind of monomer also provides ceramer coatings with improved weatherability and toughness. Preferably, the N,N-disubstituted (meth)acrylamide has a molecular weight in the range from about 99 to about 500, preferably from about 99 to about 200, in order to minimize the tendency, if any, of the colloidal inorganic oxides to flocculate and precipitate out of the ceramer composition.

The N,N-disubstituted (meth)acrylamide monomers generally have the formula:

(14)

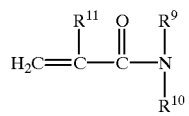

wherein $R^9$ and $R^{10}$ are each independently hydrogen, a $(C_1-C_8)$alkyl group (linear, branched, or cyclic) optionally having hydroxy, halide, carbonyl, and amido functionalities, a $(C_1-C_8)$alkylene group optionally having carbonyl and amido functionalities, a $(C_1-C_4)$alkoxymethyl group, a $(C_4-C_{18})$aryl or heteroaryl group, a $(C_1-C_3)$alk$(C_4-C_{18})$aryl group, or a $(C_4-C_{18})$heteroaryl group; with the proviso that only one of $R^9$ and $R^{10}$ is hydrogen; and $R^{11}$ is hydrogen, a halogen, or a methyl group. Preferably, $R^9$ is a $(C_1-C_4)$alkyl group; $R^{10}$ is a $(C_1-C_4)$alkyl group; and $R^{11}$ is hydrogen, or a methyl group. $R^9$ and $R^{10}$ can be the same or different. More preferably, each of $R^9$ and $R^{10}$ is $CH_3$, and $R^{11}$ is hydrogen.

Examples of such suitable (meth)acrylamides are N-(3-bromopropionamidomethyl) acrylamide, N-tert-butylacrylamide, N,N-dimethylacrylamide, N,N-diethylacrylamide, N-(5,5-dimethylhexyl)acrylamide, N-(1,1-dimethyl-3-oxobutyl)acrylamide, N-(hydroxymethyl)acrylamide, N-(isobutoxymethyl)acrylamide, N-isopropylacrylamide, N-methylacrylamide, N-ethylacrylamide, N-methyl-N-ethylacrylamide, N-(fluoren-2-yl)acrylamide, N-(2-fluorenyl)-2-methylacrylamide, 2,3-bis(2-furyl)acrylamide, N,N'-methylene-bis acrylamide. A particularly preferred (meth)acrylamide is N,N-dimethyl (meth)acrylamide.

Other examples of free-radically-curable monomers include alkenes such as ethene, 1-propene, 1-butene, 2-butene (cis or trans), compounds including an allyloxy moiety, and the like.

Multifunctional (meth)acrylate compounds suitable for use in the curable binder precursor are commercially available from a number of different suppliers. Alternatively, such compounds can be prepared using a variety of well known reaction schemes. For example, according to one approach, a (meth)acrylic acid or acyl halide or the like is reacted with a polyol having at least two, preferably about 2 to about 6, hydroxyl groups. This approach can be represented by the following schematic reaction scheme which, for purposes of illustration, shows the reaction between acrylic acid and a triol:

(15)

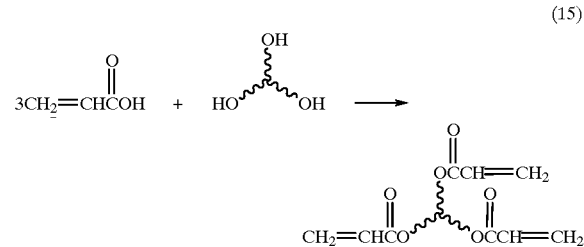

This reaction scheme as illustrated provides a trifunctional acrylate. To obtain di, tetra, penta, or hexa functional compounds, corresponding diol, tetrols, pentols, and hexols could be used in place of the triol, respectively.

According to another approach, a hydroxy or amine functional (meth)acrylate compound or the like is reacted with a polyisocyanate, or isocyanurate, or the like having about 2 to about 6 NCO groups, on average, or the equivalent. This approach can be represented by the following schematic reaction scheme which, for purposes of illustration, shows the reaction between hydroxyethyl acrylate and a triisocyanate:

(16)

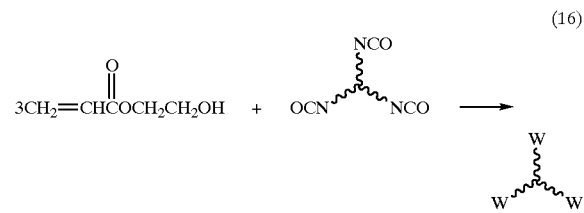

wherein each W is

This reaction scheme as illustrated provides a trifunctional (meth)acrylate. To obtain di, tetra, penta, or hexa functional compounds, corresponding multifunctional isocyanates could be used in place of the triisocyanate, respectively.

A preferred class of multifunctional (meth)acryl functional compounds includes one or more multifunctional, ethylenically unsaturated esters of (meth)acrylic acid and may be represented by the following formula:

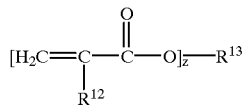

(17)

wherein $R^{12}$ is hydrogen, halogen or a $(C_1–C_4)$alkyl group; $R^{13}$ is a polyvalent organic group having m valencies and can be cyclic, branched, or linear, aliphatic, aromatic, or heterocyclic, having carbon, hydrogen, nitrogen, nonperoxidic oxygen, sulfur, or phosphorus atoms; and z is an integer designating the number of acrylic or methacrylic groups in the ester and has a value of about 2 to about 7. Preferably, $R^{12}$ is hydrogen, methyl, or ethyl, $R^{13}$ has a molecular weight of about 14 to about 100, and m has a value of about 2 to about 6. More preferably, z has a value of about 2 to about 5, most preferably about 3 to about 4. Where a mixture of multifunctional acrylates or methacrylates are used, z preferably has an average value of about 1.05 to about 3.

Specific examples of suitable multifunctional ethylenically unsaturated esters of (meth)acrylic acid are the polyacrylic acid or polymethacrylic acid esters of polyhydric alcohols including, for example, the diacrylic acid and dimethylacrylic acid ester of aliphatic diols such as ethyleneglycol, triethyleneglycol, 2,2-dimethyl-1,3-propanediol, 1,3-cyclopentanediol, 1-ethoxy-2,3-propanediol, 2-methyl-2,4-pentanediol, 1,4-cyclohexanediol, 1,6-hexamethylenediol, 1,2-cyclohexanediol, 1,6-cyclohexanedimethanol; the triacrylic acid and trimethacrylic acid esters of aliphatic triols such as glycerin, 1,2,3-propanetrimethanol, 1,2,4-butanetriol, 1,2,5-pentanetriol, 1,3,6-hexanetriol, and 1,5,10-decanetriol; the triacrylic acid and trimethacrylic acid esters of tris (hydroxyethyl) isocyanurate; the tetraacrylic and tetramethacrylic acid esters of aliphatic tetraols, such as 1,2,3,4-butanetetraol, 1,1,2,2,-tetramethylolethane, 1,1,3,3-tetramethylolpropane, and pentaerythritol triacrylate; the pentaacrylic acid and pentamethacrylic acid esters of aliphatic pentols such as adonitol; the hexaacrylic acid and hexamethacrylic acid esters of hexanols such as sorbitol and dipentaerythritol; the diacrylic acid and dimethacrylic acid esters of aromatic diols such as resorcinol, pyrocatechol, bisphenol A, and bis(2-hydroxyethyl) phthalate; the trimethacrylic acid ester of aromatic triols such as pyrogallol, phloroglucinol, and 2-phenyl-2,2-dimethylolethanol; and the hexaacrylic acid and hexamethacrylic acid esters of dihydroxy ethyl hydantoin; and mixtures thereof.

In addition to the fluoro/silane component, the crosslinkable silane component, the curable binder precursor, and the colloidal inorganic oxide, the ceramer composition may further include a solvent and other optional additives. For example, if desired, the ceramer composition may include a solvent to reduce the viscosity of the ceramer composition in order to enhance the ceramer coating characteristics. The appropriate viscosity level depends upon various factors such as the coating thickness, application technique, and the type of substrate material onto which the ceramer composition is applied. In general, the viscosity of the ceramer composition at 25° C. is about 1 to about 200 centipoise, preferably about 3 to about 75 centipoise, more preferably about 4 to about 50 centipoise, and most preferably about 5 to about 20 centipoise when measured using a Brookfield viscometer with a No. 2 cv spindle at a spindle speed of about 20 rpm. In general, sufficient solvent is used such that the solids content of the ceramer composition is about 5 to about 99%, preferably about 10 to about 70%, more preferably about 15 to about 50%, and most preferably about 30% by weight solids.

The solvent is selected to be compatible with the other components included in the ceramer composition. As used in this context, "compatible" means that there is minimal phase separation between the solvent and the other components. Additionally, the solvent should be selected such that the solvent does not adversely affect the curing properties of the ceramer composition or attack the material of the substrate. Furthermore, the solvent should be selected such that it has an appropriate drying rate. That is, the solvent should not dry too slowly, which would slow down the process of making a coated substrate. The solvent also should not dry too quickly, which could cause defects such as pin holes or craters in the resultant ceramer coating. The solvent can be an organic solvent, water, or combinations thereof. Representative examples of suitable solvents include lower alcohols such as ethanol, methanol, isopropyl alcohol, and n-butanol; ketones such as methyl ethyl ketone and methyl isobutyl ketone; glycols; glycol ethers; combinations thereof, and the like. Most preferably, the solvent is isopropanol. Using the procedure described below for making a ceramer composition, the solvent may also include a small amount, e.g. about 2% by weight, of water.

The ceramer compositions of the present invention also may include a leveling agent to improve the flow or wetting of the ceramer composition onto the substrate. If the ceramer composition does not properly wet the substrate, this can lead to visual imperfections (e.g., pin holes or ridges) in the ceramer coating. Examples of leveling agents include, but are not limited to, alkylene oxide terminated polysiloxanes such as that available under the trade designation "DOW 57" (a mixture of dimethyl-, methyl-, and (polyethylene oxide acetate-capped) siloxane) from Dow Corning, Midland, Mich., and fluorochemical surfactants such as those available under the trade designations "FC430" and "FC431" from Minnesota Mining and Manufacturing Company Co., St. Paul, Minn. The ceramer composition can include an amount of a leveling agent effective to impart the desired result. Preferably, the leveling agent is present in an amount up to about 3% by weight, and more preferably about 0.5 to about 1%, based on the total weight of the ceramer composition solids. It should be understood that combinations of different leveling agents can be used if desired.

During the manufacture of an abrasion resistant, ceramer coating of the type including a free-radically-curable binder precursor, the coated ceramer composition preferably is exposed to an energy source, e.g., radiation, which initiates the curing process of the ceramer coating. This curing process typically occurs via a free radical mechanism, which can require the use of a free radical initiator (simply referred to herein as an initiator, e.g., a photoinitiator or a thermal initiator) depending upon the energy source used. If the energy source is an electron beam, the electron beam generates free radicals and no initiator is typically required. If the energy source is ultraviolet light, or visible light, an initiator is often required. When the initiator is exposed to one of these energy sources, the initiator generates free radicals, which then initiates the polymerization and crosslinking.

Examples of suitable free radical initiators that generate a free radical source when exposed to thermal energy include, but are not limited to, peroxides such as benzoyl peroxide, azo compounds, benzophenones, and quinones. Examples of photoinitiators that generate a free radical source when exposed to visible light radiation include, but are not limited to, camphorquinones/alkyl amino benzoate mixtures. Examples of photoinitiators that generate a free radical source when exposed to ultraviolet light include, but are not limited to, organic peroxides, azo compounds, quinones, benzophenones, nitroso compounds, acryl halides, hydrozones, mercapto compounds, pyrylium compounds, ttriacrylimidazoles, bisimidazoles, chloroalkytriazines, benzoin, benzoin methyl ether, benzoin ethyl ether, benzoin isopropyl ether, benzoin isobutyl ethers and methylbenzoin, diketones such as benzil and diacetyl, phenones such as acetophenone, 2,2,2-tri-bromo-1-phenylethanone, 2,2-diethoxyacetophenone, 2,2-dimethoxy-2-phenylacetophenone, 2,2,2,-tribromo-1(2-nitrophenyl) ethanone, benzophenone, 4,4-bis(dimethyamino) benzophenone, and acyl phosphates. Examples of commercially available ultraviolet photoinitiators include those available under the trade designations "IRGACURE™ 184" (1-hydroxycyclohexyl phenyl ketone), "IRGA-CURE™ 361" and "DAROCUR™ 1173" (2-hydroxy-2-methyl-1-phenyl-propan-1-one) from Ciba-Geigy. Typically, if used, an amount of an initiator is included in the ceramer composition to effect the desired level and rate of cure. Preferably, the initiator is used in an amount of about 0.1–10%, and more preferably about 2–4% by weight, based on the total weight of the ceramer composition without solvent. It should be understood that combinations of different initiators can be used if desired.

In addition to the initiator, the ceramer composition of the present invention can include a photosensitizer. The photosensitizer aids in the formation of free radicals that initiate curing of the curable binder precursors, especially in an air atmosphere. Suitable photosensitizers include, but are not limited to, aromatic ketones and tertiary amines. Suitable aromatic ketones include, but are not limited to, benzophenone, acetophenone, benzil, benzaldehyde, and o-chlorobenzaldehyde, xanthone, thioxanthone, 9,10-anthraquinone, and many other aromatic ketones. Suitable tertiary amines include, but are not limited to, methyldiethanolamine, ethyldiethanolamine, triethanolamine, phenylmethyl-ethanolamine, dimethylaminoethylbenzoate, and the like. Typically, if used, an amount of photosensitizer is included in the ceramer compositions to effect the desired level and rate of cure. Preferably, the amount of photosensitizer used in the ceramer compositions of the present invention is about 0.01 to about 10%, more preferably about 0.05 to about 5%, and most preferably about 0.25 to about 3% by weight, based on the total weight of the ceramer composition without solvent. It should be understood that combinations of different photosensitizers can be used if desired.

Polymeric materials are known to degrade by a variety of mechanisms. Common additives that can offset this are known as stabilizers, absorbers, antioxidants, and the like. The ceramer compositions of the present invention can include one or more of the following: ultraviolet stabilizer, ultraviolet absorber, ozone stabilizer, and thermal stabilizer/antioxidant.

An ultraviolet stabilizer or ultraviolet absorber improves weatherability and reduces the "yellowing" of the abrasion resistant, ceramer coating with time. An example of an ultraviolet stabilizer includes that available under the trade designation "TINUVIN™ 292" (bis(1,2,2,6,6-pentamethyl-4-piperidinyl)sebacate) and an example of an ultraviolet absorber includes that available under the trade designation "TINUVIN™ 1130" (hydroxyphenyl benzotriazole), both of which are available from Ciba-Geigy. The ceramer composition can include an amount of either an ultraviolet stabilizer or an ultraviolet absorber to impart the desired result. Preferably, the ultraviolet stabilizer or absorber is present in an amount up to about 10% by weight, and more preferably about 1 to about 5%, based on the total weight of the ceramer composition without solvent. It should be understood that combinations of different ultraviolet stabilizers and absorbers can be used if desired.

An ozone stabilizer protects against degradation resulting from reaction with ozone. Examples of ozone stabilizers include, but are not limited to, hindered amines such as that available under the trade designation "IRGANOX™ 1010" available from Ciba-Geigy and phenoltriazine commercially available from Aldrich. The ceramer composition can include an amount of an ozone stabilizer to impart the desired result. Preferably, the ozone stabilizer is present in an amount up to about 1% by weight, more preferably about 0.1 to about 1.0%, and most preferably about 0.3 to about 0.5%, based on the total weight of the ceramer composition without solvent. It should be understood that combinations of different ozone stabilizers can be used if desired.

A thermal stabilizer/antioxidant reduces the amount of yellowing as a result of weathering. Examples of such materials include, but are not limited to, low melting hindered phenols and triesters. Specific examples include 2,6-di-tert-butyl-4-methylphenol commercially available under the trade designation "ULTRANOX™ 226" antioxidant from Borg Warner Chemicals, Inc., Parkersburg, N.Y.; octadecyl 3,5-di-tert-butyl- 4-hydroxycinnamate commercially available under the trade designations "ISONOX™ 132" antioxidant (Schenectady Chemicals, Inc., Schenectady, N.Y.) or "VANOX™ 1320" antioxidant (Vanderbilt Co., Inc., Norwalk, Conn.). The ceramer composition can include sufficient thermal stabilizer/antioxidant to impart the desired result. Preferably, the thermal stabilizer/antioxidant is present in an amount up to about 3% by weight, and more preferably about 0.5 to about 1%, based on the total weight of the ceramer composition without solvent. It should be understood that combinations of different thermal stabilizers/antioxidants can be used if desired.

According to one approach, a ceramer composition of the present invention is prepared by combining ingredients including a fluoro/silane component, a crosslinkable silane component, a curable binder precursor, and a colloidal inorganic oxide. The fluoro/silane component may be combined with a first admixture containing a colloidal inorganic oxide and a curable binder precursor in the presence of a crosslinkable silane component. The fluoro/silane component may also be premixed with the crosslinkable silane component to form a second admixture, which second admixture is then combined with the first admixture to form a third admixture, namely the ceramer composition. The crosslinkable silane component may also be premixed with the first admixture to provide a fourth admixture, and the fourth admixture combined with the fluoro/silane component to form the ceramer composition.

The fluoro/silane component, first admixture and crosslinkable silane component are combined under conditions such that at least a portion of the colloidal inorganic oxide is surface treated by the fluoro/silane component. Preferably, once so combined, the hydrolyzable silane moieties of the fluoro/silane component and the crosslinkable silane component are allowed to react with and thereby functionalize (surface treat) the colloidal inorganic oxide with pendant $R_c$ and $R_f$ functionality. By incorporating the fluoro/silane component into the ceramer composition in this manner, the resultant ceramer composition remains optically clear and, therefore, is especially useful for forming optically clear ceramer coatings.

The ceramer composition is then stripped, e. g., heated under vacuum to remove substantially all of the water. For example, removing about 98% of the water, thus leaving about 2% water in the ceramer composition, has been found to be suitable. When the curable binder precursor contains free-radically-curable prepolymers, the resultant dried ceramer composition is a clear liquid. As soon as substantially all of the water is removed, an organic solvent of the type described above is added, if desired, in an amount such that the ceramer composition preferably includes from about 5% to about 95% by weight, more preferably from about 10% to about 50% by weight, and most preferably about 15% to about 30% by weight solids.

The resultant ceramer composition is then coated onto any suitable substrate to form a coated retroreflective article for which it is desired to improve one or more of abrasion resistance, impact resistance or stain resistance. Examples of such substrates include traffic signs, lens elements on pavement markers (e.g., raised pavement markers), street name signs, pavement marking tapes, reflectors on bicycles, conspicuity markings for motor vehicles and trains, traffic cones, license plates, self adhesive stickers (such as the validation stickers that are affixed to license plates or windshields), commercial advertising signs, clothing, barrels, barricades, and the like that incorporate any kind of retroreflective structure such as a cube corner retroreflective structure, an encapsulated lens retroreflective structure, an enclosed lens retroreflective structure, and the like. Adhesion of the ceramer coating to the substrate may vary depending on the particular substrate and on other factors such as whether the substrate is primed, oriented during manufacture (unoriented or oriented axially or biaxially) or otherwise modified.

Any suitable coating technique can be used for applying the ceramer composition to the substrate, depending upon the nature of the substrate, the viscosity of the ceramer composition, and the like. Examples of suitable coating techniques include spin coating, gravure coating, flow coating, flood coating, bar coating, rolling, dipping, wire wound coating, spray coating, coating with a brush or roller, screen printing, knife coating, curtain coating, slide curtain coating, extrusion, squeegee coating, and the like. Typical protective ceramer coatings of the present invention have a thickness in the range from about 1 micron to about 100 microns, preferably about 2 to about 50 microns, more preferably about 4 to about 9 microns. Generally, ceramer coatings that are too thin may not have sufficient abrasion or impact resistance. Ceramer films that are too thick may have a greater tendency to crack.

After coating, the solvent can be flashed off with heat or allowed to evaporate under ambient conditions. If radiation curable, the coated ceramer composition is then cured by irradiation with a suitable form of energy, such as visible light, ultraviolet light or electron beam radiation. Irradiating with ultraviolet light in ambient conditions is presently preferred due to the relative low cost and speed of this curing technique. Irradiation causes the curable binder precursor and the surface treated, colloidal inorganic oxide to crosslink together to form a ceramer coating containing a polymer matrix having the colloidal inorganic oxide, and any optional additives, interspersed in the polymer matrix. The resultant ceramer-coated substrate is thereby protected against stains, abrasion, and impact.

Generally, the surfaces of cured ceramer coatings of the present invention tend to be relatively hydrophobic. Thus, dew moisture or fog moisture tends to condense on such surfaces in the form of water beads that reduce the retroreflective brightness and obscure the visibility of information provided on the underlying substrate. It is desirable in some applications, e.g., traffic signs, to treat the surface of the cured ceramer coating so that the surface becomes sufficiently hydrophilic for moisture to condense on the surface as a uniform film rather than as beads. A film of water has significantly less effect than water beads upon retroreflective brightness and visibility.

The surface of a cured ceramer coating of the present invention can be rendered hydrophilic in a number of ways. According to preferred techniques, this may be accomplished by subjecting the surface to a corona treatment as described in U.S. Pat. No. 4,772,488 or in WO 95/32237; a plasma treatment; a chemical treatment such as treatment with a chemical etchant or an oxidant such as ozone; or the like. Advantageously, such treatments render the surface hydrophilic without adversely affecting other desirable properties of the coating. For example, treated surfaces become dew resistant but remain abrasion resistant, stain resistant, flexible, and the like. When using a corona treatment, the energy level typically is at least about 1 joule/cm$^2$, preferably about 2 joules/cm$^2$ to about 20 joules/cm$^2$. Conventional, commercially available corona apparatuses may be used for this treatment. For example, one suitable corona treater is commercially available under the trade designation EGR-48C from ENI Power Systems, Inc., Rochester, N.Y.

Preferably, corona or plasma treatment is carried out under conditions such that the resultant hydrophilic, treated surface has a water contact angle of 40° or less, preferably 20° or less, more preferably 15° or less. In contrast, untreated, hydrophobic, cured ceramer coating surfaces of the present invention tend to have a water contact angle of 50 or more. In the practice of the present invention, water contact angle is determined by a procedure in which a 0.01 ml droplet of water is deposited onto the surface to be tested. The static water contact angle of the deposited droplet is measured by the method essentially as described in Zisman, W. A., "Contact Angle, Wettability and Adhesion," Advances in Chemistry, Series 43, American Chemical Society, Washington, D.C. (1964).

While not wishing to be bound by theory, it is believed that these anti-dew treatments work so well for achieving dew and anti-fogging resistance by oxidizing the coating surface without unduly affecting the underlying body of the coating material. The resultant oxidized surface is much more compatible with water than an untreated surface. It can be appreciated, therefore, that any treatment that controllably oxidizes the surface of the coating may also be used to achieve the same objective with beneficial results. The present invention will now be further described with reference to the following examples.

EXAMPLES

Test Methods

Test Procedure I: Taber Abrasion Test

This test measures the Taber abrasion of the ceramer composition when coated on a substrate and was performed according to ASTM D1044 (Standard Method for Resistance of Transparent Plastics to Surface Abrasion), the disclosure of which is incorporated herein by reference. Briefly, the test method involved abrading a sample on a TABER ABRASER™ tester for 100, 300 and 500 cycles using a 500 gram load with a CS-10F wheel at room temperature. After each cycle of exposure to the abrasive wheel the percent change in haze was measured.

Test Procedure II: Warm Water Adhesion Test

This test was designed to test the ceramer composition's durability when coated or a substrate and submersed in water at elevated temperatures. The sample was completely submerged in water at the stated temperature for the stated time period. Specifically, the samples were submerged in water baths at about 60° C. for 11 and 13 days, at about 71° C. for 6 and 8 days and at about 82° C. for 3 and 5 days. At the end of the stated time period, the samples were removed and examined for any delamination. To pass this test, the ceramer composition must not show any delamination from the substrate after a tape snap test and ASTM D3359-95a adhesion (cross-hatched) test were performed. In the tape snap test, a piece of tape is "snapped" off by pulling it rapidly at 90° to the surface of the coating, and the coating visually inspected for evidence of delamination. Minor or no evidence of delamination will yield a "pass" rating.

Test Procedure III: Weatherability

This test assesses the ability of the ceramer composition, when coated on a substrate, to withstand weathering conditions (e.g., sunlight). The test was conducted according to ASTM Test Standard G-26-88, Type B, BH (Standard Practice for Operating Light Exposure Apparatus (Xenon-Arc Type) with and without Water for Exposure of Nonmetallic Materials), the disclosure of which is incorporated by reference herein.

Briefly, a sample was exposed to a 6500 Joule/second xenon burner filter through borosilicate inner and outer filters at 0.35 W/m$^2$ in a Water Cooled Xenon Arc Model 65XWWR Weathering Chamber, available from Atlas Electric Devices Co. (Chicago, Ill.) for repetitive cycles of 102 minutes at about 63° C. followed by 18 minutes with a water spray. To provide a ceramer coating passing this test for a particular substrate, the ceramer coating must be capable of withstanding at least 1000 hours of exposure under these conditions with no significant yellowing, whitening, or other discoloration.

Undesirable results obtained from this weathering test include, in particular, whitening, delamination, and "checks", which are imperfections in the form of slight inclusions in the coating.

Test Procedure IV: Solvent Resistance Test

Solvent resistance is defined as the degradation resistance of a ceramer composition coated on a substrate when the coating is contacted with a solvent. A small amount of solvent was applied to a horizontally positioned ceramer coating. The time for lifting or dissolution (as first observed) of the ceramer coating from the substrate by softly scratching or scraping the coating with a spatula was recorded. The time immediately prior to lifting or dissolution of the ceramer coating was recorded. A time of at least 10 minutes was preferred. During testing, the test spot was kept wet by re-applying solvent if necessary.

Test Procedure V: Graffiti Resistance Test

A fine line approximately 3 centimeters long was drawn using a black SHARPIE™ fine point permanent marker (available from the Sanford Corporation, Bellwood, Ill.) on a substrate coated with a ceramer coating. This sample was stored at room temperature for about 24 hours, then wiped with a lacquer thinner (70% toluene, 15% ethyl acetate, 10% butyl acetate, and 5% butanol). After wiping, a number value of 0 to 3 was assigned based on the appearance of the wiped line. The values were defined as follows:

3=ink did not significantly wipe off;
2=some amount of ink left;
1=very small amount of ink left:
0=no ink left.

A low number is preferred.

Test Procedure VI: Contact Angle Measurement Test

A ceramer coated substrate was tested for static water contact angle using a 0.01 milliliter droplet by essentially the method described by Zisman, W. A., in Contact Angle, Wettability, and Adhesion," Advances in Chemistry, Series 43, American Chemical Society, Washington, D.C. (1964), incorporated by reference herein in its entirety. An anti-dew surface was indicated by a low (preferably <20°) water contact angle.

Test Procedure VII: 60° Gloss Measurement

60° Gloss was measured following ASTM Test Method D523-85, or ASTM D2457-97 Standard Test Method for Specular Gloss of Plastic Films and Solid Plastics (incorporated by reference herein) before and after the Abrasion Resistance test set out below, using a Pacific Scientific GLOSSGARD™ II 60° gloss meter (available from Gardner/Neotec Company, Silver Spring, Md.).

Test Procedure VIII: Brightness Measurement

This method was used to measure the retroreflective performance of retroreflective sheeting at a 0.2 observation angle and a 4 entrance angle using ASTM Test Method E810-94 (incorporated by reference herein) before and after the Abrasion Resistance test set out in Test Procedure IX.

Test Procedure IX: Abrasion Resistance Test

A slightly modified version of the Scrub Resistance ASTM TM D2486 (incorporated by reference herein) was used to measure the abrasion resistance of ceramer coated substrates. A coated substrate was applied to an aluminum blank and held in place with tightening screws in a Gardner Straight Line Washability and Abrasion Machine (available from Gardner Laboratory, Inc., Bethesda, Md.). The sample was then scrubbed for a known number of cycles with a nylon bristle brush and a Standardized Abrasive Medium, Abrasive Type #SC-2 (available from Leneta Co., Mahwah, N.J.). The samples were then washed with warm water about 45° C. (100° F.), wiped clean and retroreflectivity and 60° gloss were measured.

Test Procedure X: MEK Rub Test

This test was an indication of a coating's resistance to solvent degradation. In particular, this test was used to determine the solvent resistance of powder coated SCOTCHLITE™ Reflective License Plate Sheeting Series 3750 having graphics underneath the powder coat. The test was performed before and after applying and curing a ceramer coating.

A KAYDRY™ towel was wet with MEK and then firmly rubbed back and forth 2.5 times (50 total rubs) by hand over the sample. The sample was visually inspected and assigned a rating based upon degree of visible change. A rating of "pass" was assigned when no change was observed, while a rating of "fail" was assigned when the pigment underneath the powder coat demonstrated color fading.

Test Procedure XI: License Plate Embossability

Retroreflective sheeting was mounted on an aluminum alloy 3003-H12 blank having a thickness of 0.8 mm. An alphanumeric embossing pattern ABC 123 of about 2 mm depth was impressed using male/female dies on an Embossing Press, available from Erick Utsch KG, Siegen, Germany. A rating of "pass" was assigned when no visible cracking was evident.

Test Procedure XII: Surface Adhesion Test for Ink Receptivity

Retroreflective sheeting was mounted on aluminum alloy and embossed as in Test Procedure XI. The sample was then roll coated with Scotchlite™ Series 4800 Black Roll Coat paste, (available from 3M), an alkyd thermoset. The roll coated sample was then subjected to a tape snap test to determine the surface adhesion of ink to the ceramer. The adhesion of the external color layer of the retroreflective substrate sample was evaluated by a procedure analogous to ASTM 3359, incorporated by reference herein in its entirety. A first series of parallel lines about 1 to about 2 millimeters apart was scored in the surface of the sample, extending through the thickness of the color layer to or into the underlying layer. A second series of similar parallel lines was then scored perpendicular to the first series. A piece of adhesive tape (3M SCOTCH™ No. 610 Transparent Cellophane Tape), narrower than the array of cuts, was applied over the clear coat with a 3M PA-1 Plastic Applicator. Then the tape was snapped off at 90°. The sample was then examined and the percent of the remaining color layer was determined to assess adhesion. A sample was rated from 0 B to 5 B as specified in ASTM 3359, according to the amount of ink removed. A rating of 5B is preferred.

Test Procedure XIII: Adhesion (Cross-Hatched)

A cross-hatch test was performed using the procedure shown in ASTM D3359-95a. Measuring Adhesion by Tape Test, (incorporated by reference herein). The test on each sample was done by first cross-hatching the coated side of a sheet into approximately 0.63 centimeter squares. Next, a 7.6 centimeter piece of 5.1 centimeter wide 3M Scotch Masking Tape 232, available from 3M, was used to cover the cross-hatched area. Finally, the edge of the tape was pulled straight back and inspected for debris from the ceramer.

Test Procedure XIV: Abrasion Resistance using Steel Wool

This test used a 2.54 centimeter diameter flat pad with a #3 coarse steel wool conforming to Federal Specification FF-W-1825A with about 22±0.2 Kg) pressure as specified in ASTM D4280-96 (incorporated by reference herein) substituting sheet samples instead of markers. The test samples were visually inspected for scratches. The data excluded single scratches due to protruding steel wool whiskers.

Test Procedure XV: Abrasion Resistance—Falling Carbide

ASTM Standard Test Method D968-93 (incorporated by reference herein), for Abrasion Resistance of Organic Coatings by Falling Abrasive was used to determine abrasion resistance. 75 grams of graded silica carbide as described in D968-93 were used to abrade each spot of the samples. Each sample was then indexed to a new location and another 75 grams of silica carbide was dropped on the sample for a total of 5 spots. The 60° gloss of each sample was read before and after the test was administered using ASTM D2457-97, Standard Test Method for Specular Gloss of Plastic Films and Solid Plastics, and expressed as a percentage of the original gloss.

Test Procedure XVI: Dirt build-up resistance (Bitumen Adhesive (BT-69), SHARPIE™ pen)

This test checked the ability of the coatings to resist contaminant build-up on lens sheeting. A small piece of BT-69 bitumen adhesive, available from 3M Traffic Control Materials Division, was used to draw lines approximately 2.5 to 4 cm long on retroreflective acrylic and polycarbonate sheetings which had been bar-coated with a ceramer. The lines were then wiped off using a paper wipe (Kaydry™ EX-L made by Kimberly-Clark™). The wiped lens sheetings were visually inspected for traces of the BT-69 adhesive. A similar test was done but using a SANFORD™ black SHARPIE™ pen model 30001. Samples were rated pass if no visible trace of adhesive or ink could be seen.

Table of Components

| Acronym | Descriptions | Manufacture Information |
|---|---|---|
| A-174 | Silane A-174 Methacrylate-Functional Silane | OSI Specialties, Inc., Danbury, CT |
| BHT | Antioxidant CAO-3 Butylated Hydroxytoluene | Neville-Synthese Organics, Inc., Pittsburgh, PA |
| N,N-DMA | n,n-dimethylacrylamide | Alcolac, Baltimore, MD |
| FC405 ™ | Fluorochemical | 3M Chemicals, St. Paul, MN |
| IPA | Isopropanol | Ashland Chemical, Columbus, OH |
| Irga-Cure ™ 184 | 1-Hydroxycyclohexyl Phenyl Ketone 184 | Ciba-Specialty Chemicals Corp, Tarrytown, NY |
| Klebosol ™ 30 N 25 | Colloidal silica solution | Clariant, Basking Ridge, NJ |
| Me FC405 ™ | Me FC405 | 3M Chemicals, St. Pauls, MN |
| $NaAlO_2$ | Sodium Aluminate | Matheson Coleman and Bell, Norwood, OH |
| NALCO ™ 1034A | Colloidal silica solution | Nalco Chemical Company, Naperville, IL |
| NALCO ™ 2327 | Colloidal silica solution | Nalco Chemical Company, Naperville, IL |
| NALCO ™ $SnO_2$ | TX-9715 colloidal Tin solution | Nalco Chemical Company, Naperville, IL |
| Nyacol ™ $ZrO_2$(Ac) | Colloidal Zirconia solution | Nyacol Products Inc., Ashland, MA |
| PETA | Pentaerythritol Triacrylate SR-444C Special | Sartomer Company Inc., Exton, PA |
| Phenothiazine | Phenothiazine purified grade powder | ICI Americas Inc., Hopewell, VA |
| TINUVIN ™ 123 | bis-(1-octyloxy-2,2,6,6,tetramethyl-4-piperidinyl) | Ciba-Geigy Corp., Hawthorne, NY |
| SANDUVOR ™ 3058 | N-acrylated HALS compound | Clariant Corp., Charlotte, NC |
| TINUVIN ™ 400 | 1,3-Benzenediol,4-[4,6-bis(2,4-dimethyl)-1,3,5-triazin-2-yl] | Ciba-Geigy Corp., Hawthorne, NY |
| TINUVIN ™ 292 | bis-(1,2,2,6,6-pentamethyl-4-piperidinyl) sebacate | Ciba-Geigy Corp., Hawthorne, NY |
| TINUVIN ™ 1130 | Hydroxyphenyl benzotriazole | Ciba-Geigy Corp., Hawthorne, NY |
| TINUVIN ™ 384 | 3-(2H-benzotriazol-2-YL)-5-(tert-butyl)-4-4hydroxybenzenepropanoic acid | Ciba-Geigy Corp., Hawthorne, NY |
| Vinings Indusil 520 | Colloidal silica solution | Vinings Industries, Midway, GA |

Example 1

56.2 Parts by weight of the curable binder precursor PETA (pentaerythritol triacrylate) was heated to about 49° C. in a one liter flask. 35.2 Parts by weight silica (88 parts by weight of 40% solids, 20 nanometers average particle size, "NALCO™ 2327") were added to the PETA to form a first admixture. In a separate flask, 7.7 parts by weight of the crosslinkable silane component 3-methacryloxypropyl-trimethoxysilane, ("A-174") was mixed with 0.8 parts by weight of fluoro/silane component of Formula (11) ("FC-405") to form a second admixture. The first and second admixtures were then mixed together to form a third admixture. In a weighing tray, 0.15 parts by weight BHT (butylated hydroxytoluene) and 0.02 parts by weight phenothiazine (both based on the 56.2 parts by weight PETA) were mixed together and then added to the third admixture to form a fourth admixture.

The fourth admixture was then "stripped" by subjecting it to a gentle vacuum distillation (100±20 mm Hg) at 52°±2°

C. until most of the water/methanol was removed. A residual amount (a few weight-percent) of water remained in the dried product. At the end of the stripping process, the admixture was diluted to 50% solids with a 14:1 weight-ratio solvent of isopropyl alcohol:distilled water. This 50% solids admixture was further diluted to 25% solids with the same solvent mixture. About 0.7 parts by weight photoinitiator ("IRGACURE™ 184") was also added.

The ceramer composition was then coated onto PMMA (polymethylmethacrylate) and polycarbonate substrates at a thickness of about 4 to about 5 micrometers using conventional flow coating techniques. Each coated substrate was then flash dried at about 60° C. for 2.5 minutes in an air circulating oven to ensure that the majority of the isopropanol was driven off. Finally, the coating was cured on a conveyor belt of a UV light processor using a high pressure mercury lamp (Model QC 1202, available from PPG Industries, Plainfield, Ill.). The process conditions were 16.5 meters/minute, 410 volts, energy 90 mJ/cm$^2$, and an air atmosphere.

The resulting ceramer coatings were perfectly clear and adhered to the PMMA and polycarbonate substrates. Furthermore, the coatings passed Test Procedures I, II and III and had excellent shelf stability. After 6 months, sols prepared in accordance with the above procedure were clear, with no apparent flocculation.

Example 2

Example 2 was carried out as in Example 1 except that the crosslinkable silane component was added to the first admixture of PETA and silica, followed by addition of he fluoro/silane component. These steps were performed by heating 56.2 parts by weight of PETA to about 49° C. in a one liter flask. 35.2 Parts by weight silica (88 parts by weight of 40% solids NALCO™ 2327) was added to the flask. 7.7 Parts by weight of 3-methacryloxypropyl-trimethoxysilane were then added to the flask, followed by addition of 0.8 parts by weight of a fluoro/silane component of Formula (11). In a weighing tray, 0.15 part by weight BHT and 0.02 parts by weight phenothiazine (both based on the 56.2 parts by weight PETA) were mixed together and then added to the flask. The resulting admixture was then stripped, diluted with solvent, coated onto PMMA and polycarbonate substrates and cured as in Example 1. The resulting ceramer coatings were perfectly clear and adhered to the PMMA and polycarbonate substrates. Furthermore, the resulting ceramer coatings passed Test Procedures I, II and III.

Example 3

Example 3 was carried out as in Example 1 except that the fluoro/silane component was first added individually to the first admixture of PETA and silica, followed by addition of the crosslinkable silane component. These steps were performed by heating 56.2 parts by weight of PETA to about 49° C. in a one liter flask. 35.2 Parts by weight silica (88 parts by weight of 40% solids NALCO 2327) were added to the flask. 0.8 Parts by weight of the fluoro/silane component were then added to the flask, followed by addition of 7.7 parts by weight of 3-methacryloxypropyl-trimethoxysilane. In a weighing tray, 0.15 parts by weight BHT and 0.02 parts by weight phenothiazine (both based on the 56.2 parts by weight PETA) were mixed together and then added to the flask. The final mixture precipitated. Thus, the composition was not coatable and the experiment was not completed.

Example 4

Example 4 was carried out as in Example 1 except that 15.6 parts by weight (based on 56.2 parts by weight PETA) of dimethylacrylamide (DMA) was added to the third admixture of Example 1 before addition of the mixture of BHT and phenothiazine. The resulting admixture was then stripped, diluted with solvent, coated onto PMMA and polycarbonate substrates and cured as in Example 1. The resulting ceramer coatings were perfectly clear and adhered to the PMMA and polycarbonate substrates. Furthermore, the resulting ceramer coatings passed Test Procedures I, II and III and performed as well as the coatings of Example 1. This example thus shows that DMA may be used in the ceramer compositions of the present invention, if desired, but is not required.

Comparative Example A

This ceramer composition contained dimethylacrylamide (DMA) as a component of the binder precursor, but no fluoro/silane component. Specifically, 51.5 parts by weight of PETA were heated to about 49° C. 32.4 Parts by weight silica (88 parts by weight of 40% solids NALCO 2327) were added to the PETA to form a first admixture. In a separate flask, 8.1 parts by weight of 3-methacryloxypropyl-trimethoxysilane were mixed with 8.0 parts by weight DMA to form a DMA-altered second admixture. The first admixture was mixed with the DMA-altered second admixture to form a third admixture. In a weighing tray, 0.15 parts by weight BHT and 0.02 parts by weight phenothiazine (both based on the 51.5 parts by weight PETA) were mixed together and then added to the third admixture to form a fourth admixture.

The fourth admixture was then stripped, diluted with solvent, coated onto PMMA and polycarbonate substrates and cured as in Example 1. Like the ceramer coating of Example 1, the ceramer coatings of this comparative example were perfectly clear, adhered to the PMMA and polycarbonate substrates, and passed Test Procedures I, II and III. Thus in these tested respects, a composition of the invention performed comparably to a ceramer made using DMA but no fluoro/silane component.

Comparative Example B

Comparative Example B was prepared as described in Example 2 except that no fluoro/silane component was added. 56.2 Parts by weight of PETA were heated to about 49° C. (120° F.) in a one liter flask. 35.2 Parts by weight silica (88 parts by weight of 40% solids NALCO 2327) were added to the PETA to form a first admixture. 7.7 Parts by weight of 3-methacryloxypropyl-trimethoxysilane were then added to the flask, followed by the addition of 15.6 parts by weight DMA (based on 56.2 parts by weight PETA). In a weighing tray, 0.15 parts by weight BHT and 0.02 parts by weight phenothiazine (both based on the 56.2 parts by weight PETA) were mixed together and then added to the flask.

The resulting admixture was then stripped, diluted with solvent, coated onto PMMA and polycarbonate substrates and cured as in Example 2. Like the ceramer coating of Example 2, the ceramer coatings of this comparative example were perfectly clear, adhered to the PMMA and polycarbonate substrates, and passed Test Procedures I, II and III. Thus in these tested respects, a composition of the invention performed comparably to a ceramer made using DMA but no fluoro/silane component.

Comparative Example C

Comparative Example C was a hardcoating prepared using commercially available coating material from Cyro Corp., Rockaway, N.J., under the trade designation "CYRO AR".

Summary of Results

The ceramer coatings described above were evaluated using a variety of test methods. As is illustrated in the following Tables 2 through 9 and in Examples 1–2 and 4, a nonionic fluorochemical containing both a fluorinated moiety and a silane moiety (the fluoro/silane component) can be successfully incorporated into a ceramer sol, without causing colloid flocculation. Ceramer coatings containing such a fluoro/silane component, whether prepared with or without DMA, have surprisingly long shelf lives and excellent stain resistant characteristics (See Examples 1 and 4). Additionally, ceramer compositions of the present invention can be used to prepare ceramer coatings that exhibit a high level of abrasion resistance, durability and hardness (See Tables 2–9). Some of the coatings shown in Tables 2–9 employed additives tabulated in Table 1. The amounts of such additives are expressed based on the weight of ceramer solids.

TABLE 1

| Additive | Components on Ceramer Basis |
|---|---|
| I | 0.9 parts by weight "TINUVIN ™ 123" |
|  | 1.6 parts by weight "SANDUVOR² 3058" |
|  | 2.8 parts by weight "TINUVIN ™ 1130" |
|  | 2.8 parts by weight "TINUVIN ™ 400" |
| II | 2 parts by weight "TINUVIN ™ 292" |
| III | 2 parts by weight "TINUVIN ™ 292" |
|  | 2 parts by weight "TINUVIN ™ 384" |
| IV | 1.2 parts by weight "TINUVIN ™ 123" |
|  | 0.7 parts by weight "SANDUVOR 3058" |
|  | 2.07 parts by weight "TINUVIN ™ 384" |
|  | 2.07 parts by weight "TINUVIN ™ 400" |

TABLE 2

Taber Abrasion Test - Coated on PMMA
Percent Haze

| Sample | 100 cycles | 300 cycles | 500 cycles |
|---|---|---|---|
| Comp. A* | 2.6 | 3.1 | 4.1 |
| Example 4* | 2.0 | 3.0 | 3.6 |
| Comp. B | 1.4 | 3.0 | 3.9 |
| Example 1 | 1.3 | 3.1 | 3.9 |
| Example 4 | 0.9 | 2.4 | 3.2 |
| Comp. A** | 1.9 | 3.6 | 4.2 |
| Comp. B** | 1.5 | 2.8 | 3.7 |
| Example 1** | 1.6 | 3.3 | 4.1 |
| Example 4** | 1.3 | 2.9 | 3.5 |

Samples denoted with "*" included 4 wt-% of additive III on a ceramer weight basis.
Samples denoted with "**" included 2 wt-% of additive II.

TABLE 3

Taber Abrasion Test - Coated on Polycarbonate
Percent Haze

| Sample | 100 cycles | 300 cycles | 500 cycles |
|---|---|---|---|
| Example 1 | 1.7 | 3.3 | 4.1 |
| Example 4 | 1.3 | 2.8 | 3.5 |
| Comp. A* | 3.1 | 3.2 | 3.8 |
| Example 4* | 2.8 | 2.7 | 3.1 |
| Comp. B | 1.3 | 2.3 | 3.2 |
| Example 1 | 1.0 | 2.5 | 3.2 |
| Example 4 | 1.0 | 2.3 | 3.1 |
| Comp. A** | 2.5 | 2.9 | 4.4 |
| Comp. B** | 3.0 | 2.5 | 3.5 |
| Example 1** | 3.0 | 2.6 | 3.3 |
| Example 4** | 2.7 | 2.2 | 3.1 |
| Comp. C. | 2.5 | 3.0 | 3.8 |

Samples denoted with "*" included 6 wt-% of additive IV on a ceramer weight basis.
Samples denoted with "**" included 8 wt-% of additive I.

TABLE 4

Warm Water Adhesion Test - Coated on PMMA

| Sample | 11 days @ 60° C. | 8 days @ 71° C. | 3 days @ 82° C. |
|---|---|---|---|
| Example 1 | pass | pass | pass |
| Example 4 | pass | pass | pass |
| Comp. A* | pass | pass | pass |
| Example 4* | pass | pass | pass |

Samples denoted with "*" included 4 wt-% of additive III on a ceramer weight basis.

TABLE 5

Warm Water Adhesion Test - Coated on PMMA

| Sample | 13 days @ 60° C. | 6 days @ 71° C. | 5 days @ 82° C. |
|---|---|---|---|
| Comp. B | pass | pass | pass |
| Example 1 | pass | pass | pass |
| Example 4 | pass | pass | pass |
| Comp. A* | pass | pass | pass |
| Comp. B* | pass | pass | pass |
| Example 1* | pass | pass | pass |
| Example 4* | pass | pass | pass |
| Comp. C. | pass | pass | pass |

Samples denoted with "*" included 2 wt-% of additive II on a ceramer weight basis.

TABLE 6

Warm Water Adhesion Test - Coated on Polycarbonate

| Sample | 11 days @ 60° C. | 8 days @ 71° C. | 3 days @ 82° C. |
|---|---|---|---|
| Comp. A | pass | pass | pass |
| Example 1 | pass | pass | pass |
| Example 4 | pass | pass | pass |
| Comp. A* | pass | pass | pass |
| Example 4* | pass | pass | pass |

Samples denoted with "*" included 6 wt-% of additive IV on a ceramer weight basis.

TABLE 7

Warm Water Adhesion Test - Coated on Polycarbonate

| Sample | 13 days @ 60° C. | 6 days @ 71° C. | 5 days @ 82° C. |
|---|---|---|---|
| Comp. A | Pass | pass | pass |
| Comp. B | pass | pass | pass |
| Example 1 | pass | pass | pass |
| Example 4 | pass | pass | pass |
| Comp. A* | pass | pass | delaminated |
| Comp. B* | pass | pass | delaminated |
| Example 1* | pass | pass | delaminated |

TABLE 7-continued

Warm Water Adhesion Test - Coated on Polycarbonate

| Sample | 13 days @ 60° C. | 6 days @ 71° C. | 5 days @ 82° C. |
| --- | --- | --- | --- |
| Example 4* | pass | pass | delaminated |
| Comp. C. | pass | pass | pass |

Samples denoted with "*"included 8 wt-% of additive I on a ceramer weight basis.

TABLE 8

Weathering Test - Coated on PMMA

| Sample | Hours |
| --- | --- |
| Example 1 | 1400 - few small checks |
| Example 4 | 1400 - few small checks |
| Comp. A | 1400 - few small checks |
| Example 1* | 3700 - few long checks |
| Example 4* | Not done |
| Comp. A* | 3515+ |
| Example 1 | 1800 - checks, slight whitening |
| Example 4 | 1800 - checks, slight whitening |
| Comp. B | 1800 - checks, slight whitening |
| Example 1** | 2425+ |
| Example 4** | 2425+ |
| Comp. A** | 3515+ |
| Comp. B** | 2425+ |

+denotes that the test is on going
Samples denoted with "*" included 4 wt-% of additive III on a ceramer weight basis.
Samples denoted with "**" included 2 wt-% of additive II on a ceramer weight basis.

TABLE 9

Weathering Test - Coated on Polycarbonate

| Sample | Hours |
| --- | --- |
| Example 1 | 1000 - 20% delamination |
| Example 4 | 1000 - total delamination |
| Comp. A | ~800 |
| Example 1* | 2400 - slight delamination |
| Example 4* | Not done |
| Comp. A* | 2200 |
| Example 1 | ~750 |
| Example 4 | ~750 |
| Comp. A | ~800 |
| Comp. B | ~900 |
| Example 1** | 2425 - slight delamination & very small checks |
| Example 4** | 2425 - slight delamination & very small checks |
| Comp. A** | ~2500 |
| Comp. B** | 2425 - slight delamination |

Samples denoted with "*" included 6 wt-% of additive IV on a ceramer weight basis.
Samples denoted with "**" included 8 wt-% of additive I on a ceramer weight basis.

Example 5

Example 5 was prepared as described in Example 1, except a silica/alumina mixture was substituted for the silica. Thus, 56.2 parts by weight of PETA were preheated to about 49° C. and then combined with 35.3 parts by weight of silica (88 parts by weight of 40% solids NALCO™ 2327, 20 nm) and 1 part by weight sodium aluminate (NaAlO$_2$) to form a first admixture. A second admixture of 7.8 parts by weight of A-174 and 0.8 parts by weight of the compound of Formula (11) was prepared and added to the first admixture with stirring to form a third admixture. In a weighing tray, 0.15 parts by weight BHT and 0.02 parts by weight phenothiazine (both based on the 56.2 parts by weight PETA) were mixed together and then added to the third admixture to form a fourth admixture.

The fourth admixture was then stripped, diluted with solvent, coated onto PMMA and polycarbonate substrates and cured as in Example 1.

Example 6

Example 6 was carried out as described in Example 5, except dimethylacrylamide was added to the other ingredients in the second admixture. The second admixture contained about 0.7 parts by weight of A-174, 0.8 parts by weight of the compound of Formula (11) and 8.0 parts by weight of dimethylacrylamide. The ceramer composition was stripped, diluted with solvent, coated onto PMMA and polycarbonate substrates and cured as in Example 1.

Example 7

The ceramer composition of Example 1 was flow coated onto the PMMA topcoat of DIAMOND GRADE™ Retroreflective Sheeting Series 3900, available from 3M. Immediately after the flow coating operation was completed (about 30 seconds), the sheeting was dried in a conventional forced-air oven at about 65° C. for 2 minutes. The coated sheeting was then placed on a conveyor belt of a UV processor (Model C18/400/2 available from American Ultraviolet Co. Murray Hill, N.J.) equipped with a medium-pressure mercury lamp. The process conditions were 7.6 meters/minute line speed; 600 volts; 1.28 joules/cm$^2$ energy, and an air atmosphere. The resulting coating was visibly clear. Half of this coated sheeting was then corona treated twice using 500 Joule/second power and a web speed of 0.9 meters/minute. The corona treated and non-corona treated sheetings were applied to aluminum panels and tested for solvent resistance, water contact angle, and graffiti resistance according to the test methods disclosed above. Water contact angle was tested immediately after corona treatment, and after soaking the corona treated film in water for 24 hours and then drying at room temperature for about 2 to about 3 hours.

Example 8

The ceramer composition of Example 1 was flow coated onto the PMMA topcoat of HIGH INTENSITY™ Retroreflective Sheeting Series 3800, available from 3M. The coated sheeting was then dried, UV cured, corona treated and tested as in Example 7.

Example 9

The ceramer composition of Example 5 was flow coated onto the PMMA topcoat of DIAMOND GRADE™ Retroreflective Sheeting Series 3900, available from 3M. The coated sheeting was then dried, UV cured, corona treated and tested as in Example 7.

Example 10

The ceramer composition of Example 5 was flow coated onto the PMMA topcoat of HIGH INTENSITY™ Retroreflective Sheeting Series 3800, available from 3M. The coated sheeting was then dried, UV cured, corona treated and tested as in Example 7.

Example 11

SCOTCHLITE™ Preclear Reflective License Plate Sheeting Series 4780A (available from 3M) was applied to an aluminum blank to form license plate. The license plate sheeting has lens elements embedded within a transparent resin and a urethane topcoat. The topcoat was flood coated with the ceramer composition of Example 1 by holding the plate in a vertical position, while applying the ceramer composition using a spray bottle and a continuous motion to cover the topcoat completely. After allowing the excess composition to drain from the plate, the plate was dried in a conventional forced-air oven at about 66° C. for about 2 minutes to ensure that the majority of the isopropanol was driven off. Finally, the ceramer coating was cured on a conveyor belt of a UV light processor using a medium pressure mercury lamp. The process conditions were 8.3 meters/min, 1524 Joule/second/cm, 1.22 J/cm$^2$ and an air atmosphere. The resulting ceramer coatings were visibly clear. The coated plate and a control plate made from untreated SCOTCHLITE™ Preclear Reflective License Plate Sheeting Series 4780A were tested for abrasion resistance, graffiti resistance, ink receptivity, and embossability.

Example 12

A sample of the sheeting used in Example 11 but having an EAA (ethylene acrylic acid) topcoat rather than a urethane topcoat was used to prepare a ceramer-coated plate using the method of Example 11. The UV light processor was operated at 8.2 meters/min rather than 8.3 meters/min but the other process conditions were as in Example 11. The coated plate and a control plate made from untreated SCOTCHLITE™ Preclear Reflective License Plate Sheeting Series 4780A (available from 3M) without the urethane topcoat were tested for abrasion resistance and graffiti resistance.

Example 13

SCOTCHLITE™ Preclear Reflective License Plate Sheeting Series 4750A (available from 3M) was applied to an aluminum blank and coated with the ceramer composition of Example 1 using the method of Example 11. The coated plate and a control plate made from untreated SCOTCHLITE™ Preclear Reflective License Plate Sheeting Series 4750A were tested for abrasion resistance, graffiti resistance, ink receptivity, and embossability.

Example 14

SCOTCHLITE™ Reflective License Plate Sheeting Series 3750 (available from 3M) was applied to an aluminum blank and clear coated using acrylic powder B66 (available from Rohm and Haas, Philadelphia, Pa.) by heating the plate and powder coating at 300° C. for about 20 minutes. This plate was then coated with the ceramer composition of Example 1 using the method of Example 11. The coated plate and a control plate made from uncoated SCOTCHLITE™ Reflective License Plate Sheeting Series 3750 were tested for abrasion resistance and graffiti resistance.

Example 15

SCOTCHLITE™ Reflective License Plate Sheeting Series 3750 was applied to an aluminum blank. A graphic was created on the plate using PCN Blue VAGH DISP 815284 colorant (available from Penn Color Inc. Doylestown, Pa.). The plate was clear coated using acrylic powder B66 and then coated with the ceramer composition of Example 1 using the method of Example 14. The coated plate and a control plate made from uncoated SCOTCHLITE™ Reflective License Plate Sheeting Series 3750 were tested for abrasion resistance and solvent resistance using the MEK rub test.

TABLE 10

Water Contact Angle, Solvent Resistance, and Graffiti Resistance Results Before and After Corona Treatment

| Example | Contact Angle before water soaking | Contact Angle after soaking in water 24 Hr and drying | Solvent Resistance toluene/xylene 30/70 | Solvent Resistance MEK | Graffiti resistance |
|---|---|---|---|---|---|
| 7 (non-corona) | 82° | 90–91° | >20 minute | >15 minute | 0 |
| 7 (corona) | 6–15° | 15–22° | >20 minute | >15 minute | 0 |
| 8 (non-corona) | 89° | 90° | >20 minute | >15 minute | 0 |
| 8 (corona) | 16° | 17° | >20 minute | >15 minute | 0 |

TABLE 11

Water Contact Angle, Abrasion Resistance, and Solvent Resistance Results Before and After Corona Treatment

| Example | contact angle | scrub cycles | Brightness @ .2/−4 | | | 60° Gloss | | | solvent resistance toluene/ xylene 30/70 | solvent Resistance MEK | Graffiti resistance |
| | | | initial | Final (after scrub cycle) | % Ret | Initial | Final (after scrub cycle) | % Ret | | | |
|---|---|---|---|---|---|---|---|---|---|---|---|
| 9 (non-corona) | 87° | 100 | 1083 | 891 | 82% | 97 | 77 | 79% | >15 minute | >15 minute | 0 |
| 9 (corona) | 15° | 100 | 1050 | 890 | 85% | 95 | 83 | 87% | >15 minute | >15 minute | 0 |
| 10 (non-corona) | 86° | 100 | 320 | 248 | 78% | 125 | 111 | 89% | >15 minute | >15 minute | 0 |
| 10 (corona) | 12° | 100 | 301 | 268 | 89% | 124 | 108 | 87% | >15 minute | >15 minute | 0 |

TABLE 12

Comparison of Brightness and Gloss Retention for
Various License Plate sheetings Before and After Ceramer Coating

| | | Brightness @ .2/−4 | | | 60° Gloss | | | |
|---|---|---|---|---|---|---|---|---|
| Example | Scrub Cycle | Init | Final (after scrub cycle) | % Ret | Init | Final (after scrub cycle) | % Ret | Graffiti Resistance |
| 11 | 100 | 95.5 | 72.2 | 76% | 85.6 | 65.1 | 76% | 0 |
| Control 11 | 100 | 101.5 | 67.5 | 67% | 86.7 | 51.9 | 60% | 1 |
| 12 | 100 | 82.7 | 65 | 79% | 85.6 | 65.1 | 76% | 0 |
| Control 12 | 100 | 88.6 | 9.3 | 10% | 88.0 | 9.6 | 11% | 2 |
| 13 | 100 | 84.6 | 82.3 | 97% | 83.2 | 78.7 | 95% | 2 |
| Control 13 | 100 | 80.1 | 35.6 | 44% | 89.9 | 33.6 | 37% | 3 |
| 14 | 100 | 93.4 | 54.9 | 59% | 60.1 | 62.0 | 103% | 0 |
| Control 14 | 100 | 61.5 | 18.4 | 30% | 64.0 | 29.7 | 46% | * |

*Removal of inks using the solvents destroyed the top film thus also destroying the retroreflectivity.

TABLE 13

Comparison of Brightness and Gloss Retention
for SCOTCHLITE ™ Reflective License Plate Sheeting Series 3750 with
Graphic Underneath Acrylic Powder Coat Before and After Ceramer Coating

| | | Brightness @ .2/−4 | | | 60° Gloss | | | |
|---|---|---|---|---|---|---|---|---|
| Example | Scrub Cycle | Init | Final (after scrub cycle) | % Ret | Init | Final (after scrub cycle) | % Ret | MEK Rub Test |
| 15 | 100 | 26.9 | 28.9 | 107% | 22 | 22 | 100% | pass |
| Control 15 | 100 | 96.6 | 25.6 | 27% | 42 | 25.6 | 61% | fail |

TABLE 14

License Plate
Embossability and Surface Adhesion Test for Ink Receptivity

| Example | Ink | Embossability | Surface adhesion of Ink |
|---|---|---|---|
| 11 | 4805 V | Pass | 5B |
| 11 | 4852 Vinyl | Pass | 5B |
| 13 | 4805 V | Pass | 5B |
| 13 | 4852 Vinyl | Pass | 5B |

Example 16

Ceramer formulations 16-1 to 16-17 were coated onto retroreflective cube corner sheeting made of 0.15 centimeter thick polycarbonate with a 0.0076 centimeter thick PMMA top layer. The composition and test results for the ceramer formulations are set out below in Tables 15 to 17. The composition and test results for a comparison ceramer formulation are set out below in Table 18.

Formulations 16-1 and 16-6 and the comparison formulation were applied to the sheeting using a spray coating process. The formulations were diluted with isopropanol and N-butanol (2:1 ratio) to about 21% solids and applied to the non-cube side of the sheeting. The solvents were removed using convection or infrared drying. The maximum sheet temperature did not exceed 110° C. The ceramer formulations were crosslinked using a UV exposure unit at a UV energy dosage of approximately 0.70 J/cm$^2$. The dry ceramer coating thickness ranged from about 4 to about 15 micrometers, with a target range of about 9 to about 12 micrometers.

The remaining ceramer formulations were applied to the sheeting using either a flow coating or a notched bar coating process. Flow coated samples were prepared by using an eyedropper to deliver the ceramer formulation along the top edge of the sheeting while maintaining the sheeting in a vertical orientation. Bar coated samples were prepared by drawing the ceramer formulation across the sheet using a straight metal bar maintained at a 50.8 micrometer gap. The coated sheets were placed into an oven at about 67° to about 78° C. for approximately 2 minutes to remove solvents. The sheets were then exposed to UV energy of at least 0.17 J/cm$^2$, with a target range of about 0.5 J/cm$^2$ to about 1.5 J/cm$^2$.

The coated and control sheets were evaluated using Taber Abraser, Falling Silica Carbide, Steel Wool Rub, Sharpie™ Pen, Bitumen Stain, and Cross Hatch Adhesion tests. The results are set out below in tables 15 to 18.

TABLE 15

Formulations with Various FC405 to A-174 Ratios

| | Formulation | | | | | |
|---|---|---|---|---|---|---|
| | 16-1 | 16-2 | 16-3 | 16-4 | 16-5 | 16-6 |
| PETA | 21.6% | 22.2% | 21.8% | 21.8% | 21.8% | 21.8% |
| Nalco 2327 | 34.0% | 34.8% | 34.3% | 34.3% | 34.3% | 34.3% |
| A-174 | 3.9% | 1.7% | 3.1% | 3.1% | 2.9% | 3.3% |
| FC405 | 0.3% | 0.3% | 0.3% | 0.3% | 0.5% | 0.2% |
| BHT | 0.033% | 0.034% | 0.034% | 0.034% | 0.034% | 0.034% |
| Phenothiazine | 0.004% | 0.004% | 0.004% | 0.004% | 0.004% | 0.004% |
| IRGACURE ™ 184 | 0.850% | 0.857% | 0.844% | 0.852% | 0.856% | 0.848% |
| TINUVIN ™ 292 | 0.688% | 0.694% | 0.690% | 0.690% | 0.693% | 0.687% |
| IPA | 36.0% | 36.8% | 36.3% | 36.3% | 36.3% | 36.3% |
| Water | 2.6% | 2.6% | 2.6% | 2.6% | 2.6% | 2.6% |
| Total Weight (%): | 100% | 100% | 100% | 100% | 100% | 100% |
| Taber Gloss Retention: | 93% | 91% | 87% | 77% | 88% | 88% |
| Falling Carbide Gloss Retention: | 89.86% | 88.24% | 88.89% | 93.44% | 97.06% | 100.00% |
| Steel Wool Test: | Pass | Pass | Pass | Pass | Pass | Pass |
| SHARPIE ™ Pen Test: | Pass | Pass | Pass | Pass | Pass | Pass |
| Bitumen Test: | No Data | No Data | Pass | No Data | No Data | Pass |
| Cross-hatched: | Pass | Pass | Pass | Pass | Pass | Pass |

TABLE 16

Formulations with Various Silica Particles

| | Formulation | | |
|---|---|---|---|
| | 16-7 | 16-8 | 16-9 |
| PETA | 20.42% | 22.03% | 19.57% |
| Nalco 1034A | 38.47% | 0.00% | 0.00% |
| Vinings Indusil 520 | 0.00% | 33.75% | 0.00% |
| Klebosol 30 N 25 | 0.00% | 0.00% | 40.97% |
| A-174 ™ | 2.90% | 3.13% | 2.78% |
| FC405 ™ | 0.31% | 0.33% | 0.29% |
| BHT | 0.03% | 0.03% | 0.03% |
| Phenothiazine | 0.00% | 0.00% | 0.00% |
| IRGACURE ™ 184 | 0.85% | 0.84% | 0.85% |
| TINUVIN ™ 292 | 0.69% | 0.68% | 0.69% |
| IPA | 33.91% | 36.59% | 32.50% |
| Water | 2.42% | 2.61% | 2.32% |
| Total Weight (%): | 100% | 100% | 100% |
| Taber Abraser Gloss Retention: | 65% | 88% | 85% |
| Falling Carbide Gloss Retention: | 93.94% | 88.14% | 90.63% |
| Steel Wool Test: | Pass | Pass | Pass |
| Sharpie Pen Test: | Pass | Pass | Pass |
| Bitumen Test: | Pass | No Data | No Data |
| Cross-hatched: | Pass | Pass | Pass |

TABLE 17

Formulations Containing Mixed SiO$_2$/Metal Oxides

| | Formulation | | | | | |
|---|---|---|---|---|---|---|
| | 16-10 | 16-11 | 16-12 | 16-13 | 16-14 | 16-15 |
| PETA | 21.81% | 21.08% | 21.50% | 21.78% | 21.46% | 21.10% |
| NALCO 2327 | 34.24% | 33.10% | 32.07% | 34.19% | 32.02% | 29.82% |
| SnO2 | 0.00% | 0.00% | 3.21% | 0.00% | 3.37% | 6.63% |
| NaAlO2 | 0.14% | 0.14% | 0.00% | 0.28% | 0.00% | 0.00% |
| A-174 ™ | 3.09% | 2.99% | 3.05% | 3.09% | 3.05% | 2.99% |
| FC405 (Et) | 0.33% | 0.32% | 0.32% | 0.33% | 0.32% | 0.32% |
| N,N-DMA | 0.00% | 3.28% | 0.00% | 0.00% | 0.00% | 0.00% |
| BHT | 0.03% | 0.03% | 0.03% | 0.03% | 0.03% | 0.03% |
| Phenothiazine | 0.00% | 0.00% | 0.00% | 0.00% | 0.00% | 0.00% |
| IRGACURE ™ 184 | 0.85% | 0.85% | 0.85% | 0.85% | 0.85% | 0.85% |
| TINUVIN ™ 292 | 0.69% | 0.69% | 0.69% | 0.69% | 0.69% | 0.69% |
| IPA | 36.23% | 35.02% | 35.71% | 36.17% | 35.66% | 35.05% |
| Water | 2.59% | 2.50% | 2.55% | 2.58% | 2.55% | 2.50% |
| Total Weight(%): | 100% | 100% | 100% | 100% | 100% | 100% |
| Taber Abraser Gloss Retention: | 93% | 87% | 85% | 86% | 75% | 64% |
| Falling Carbide Gloss Retention: | 90.63% | 81.54% | 88.14% | 92.98% | 77.27% | 87.88% |
| Steel Wool Test: | Pass | Pass | Pass | Pass | Pass | Pass |

TABLE 17-continued

Formulations Containing Mixed SiO$_2$/Metal Oxides

| | Formulation | | | | | |
|---|---|---|---|---|---|---|
| | 16-10 | 16-11 | 16-12 | 16-13 | 16-14 | 16-15 |
| SHARPIE ™ Pen Test: | Pass | Pass | Pass | Pass | Pass | Pass |
| Cross-hatched: | Pass | Pass | Pass | Pass | Pass | Pass |

TABLE 18

Comparison DMA Based Ceramer

| | Comparison Formulation |
|---|---|
| PETA | 20.75% |
| NALCO 2327 | 32.58% |
| N,N-DMA | 3.23% |
| A-174 | 3.27% |
| BHT | 0.03% |
| Phenothiazine | <<.001% |
| TINUVIN ™ 292 | 0.69% |
| Irga-Cure | 0.86% |
| IPA | 37.46% |
| Distilled Water | 2.68% |
| Taber Abraser Gloss Retention: | 64% |
| Falling Carbide Gloss Retention: | 103% |
| Steel Wool Test: | Pass |
| SHARPIE ™ Pen Test: | Pass |
| Bitumen Test: | Pass |
| Cross-hatched: | Pass |

Other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the following claims.

We claim:

1. A retroreflective article, comprising a substrate and a coating provided on at least a portion of a surface of the substrate, the coated portion being retroreflective and the coating comprising a cured ceramer derived from ingredients comprising:
   (a) free-radically-curable binder;
   (b) colloidal inorganic oxide; and
   (c) fluoro/silane that comprised a hydrolyzable silane moiety and a fluorinated moiety.

2. The retroreflective article of claim 1, wherein the cured ceramer is also derived from crosslinkable silane that comprised a hydrolyzable silane moiety and a free-radically-curable moiety.

3. The retroreflective article of claim 1, wherein at least a portion of the inorganic oxide is surface treated by the fluoro/silane.

4. The retroreflective article of claim 1, wherein the substrate comprises a raised pavement marker having one or more retroreflective elements on said surface; or a traffic sign, license plate or self-adhesive sticker, bearing visually observable information; and wherein the coating is applied over at least a portion of the elements or the information.

5. The retroreflective article of claim 1, wherein the substrate comprises a plurality of retroreflective cube-corner elements.

6. The retroreflective article of claim 1, wherein the coating helps to complete the retroreflective optics of the retroreflective article.

7. The retroreflective article of claim 1, wherein the coated surface is abrasion resistant as evaluated using ASTM D1044.

8. The retroreflective article of claim 1, wherein the coated surface resists dirt build-up as evaluated by attempting to mark the surface using bitumen adhesive and permanent ink.

9. The retroreflective article of claim 1, wherein the coated surface is dew resistant as evaluated by measuring its water contact angle.

10. The retroreflective article of claim 1, wherein the coated surface is graffiti resistant as evaluated using permanent ink and lacquer thinner.

11. The retroreflective article of claim 1, wherein the fluoro/silane was of the formula:

$$(S_y)_r\text{—W—}(R_f)_s$$

wherein $S_y$ represents a hydrolyzable silane moiety; $R_f$ represents a fluorinated moiety; r is at least 1; s is at least 1; and W is a linking group having a valency of r+s.

12. The retroreflective article of claim 2, wherein the crosslinkable silane was of the formula:

$$(S_y)_q\text{—W}°\text{—}(R_c)_p$$

wherein $S_y$ represents a hydrolyzable silane moiety; $R_c$ is a moiety comprising free-radically-curable functionality; q is at least 1; p is at least 1; and W° is a linking group having a valency of q+p.

13. The retroreflective article of claim 1, wherein the curable binder comprised one or more (meth)acrylate or (meth)acrylamide monomers.

14. The retroreflective article of claim 1, wherein the inorganic oxide comprises a mixture of a major amount of silica and a minor amount of at least one other inorganic oxide.

15. The retroreflective article of claim 14, wherein the other inorganic oxide comprises alumina.

16. A method of coating a retroreflective substrate with a ceramer coating, comprising the steps of:
   (a) stripping water from a mixture comprising
      (i) colloidal inorganic oxide sol that is surface treated with a fluoro/silane that comprised a hydrolyzable silane moiety and a fluorinated moiety and
      (ii) free-radically-curable binder;
   (b) coating the stripped composition onto a retroreflective substrate; and (c) curing the coating to form a ceramer coating on the substrate.

17. The method of claim 16, wherein the inorganic oxide is also surface treated with a crosslinkable silane that comprised a hydrolyzable silane moiety and a free-radically-curable moiety, and the weight ratio of the crosslinkable silane to the fluoro/silane was between 4:1 and 20:1.

18. The method of claim 16, wherein after the curing step the ceramer coating has a surface water contact angle greater than 20°, and further comprising the step of treating the surface of the cured ceramer coating to reduce the surface water contact angle to less than 20°.

* * * * *

UNITED STATES PATENT AND TRADEMARK OFFICE
CERTIFICATE OF CORRECTION

PATENT NO.     : 6,265,061 B1
DATED          : July 24, 2001
INVENTOR(S)    : Kang et al.

It is certified that error appears in the above-identified patent and that said Letters Patent is hereby corrected as shown below:

Column 1,
Line 10, "Oprior: should read -- prior --.
Line 11, delete "pending" and insert therefore -- pat. 6,132,861 --.

Column 21,
Line 11, "ttriacrylimidazoles" should read -- triacrylimidazoles --.

Column 26,
Line 24, "4" should read -- 4 --.

Column 27,
Line 20, "SB" should read -- 5B --.

Column 28,
Line 19, "Pauls," should read -- Paul, --.

Column 29,
Line 31, "he" should read -- the --.

Signed and Sealed this

Twenty-third Day of July, 2002

Attest:

JAMES E. ROGAN
Attesting Officer       Director of the United States Patent and Trademark Office